US012619450B2

(12) United States Patent
Mo

(10) Patent No.: US 12,619,450 B2
(45) Date of Patent: May 5, 2026

(54) APPLICATION SWITCHING METHOD, TERMINAL AND STORAGE MEDIUM

(71) Applicant: GUANGDONG OPPO MOBILE TELECOMMUNICATIONS CORP., LTD., Guangdong (CN)

(72) Inventor: Boyu Mo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 257 days.

(21) Appl. No.: 18/365,524

(22) Filed: Aug. 4, 2023

(65) Prior Publication Data

US 2023/0376325 A1 Nov. 23, 2023

Related U.S. Application Data

(63) Continuation of application No. PCT/CN2022/073473, filed on Jan. 24, 2022.

(30) Foreign Application Priority Data

Feb. 7, 2021 (CN) ......................... 202110169218.X

(51) Int. Cl.
G06F 9/451 (2018.01)
G06F 3/0482 (2013.01)
G06F 3/04845 (2022.01)

(52) U.S. Cl.
CPC ............ G06F 9/451 (2018.02); G06F 3/0482 (2013.01); G06F 3/04845 (2013.01)

(58) Field of Classification Search
CPC .... G06F 9/451; G06F 3/0482; G06F 3/04845; G06F 2203/04803; G06F 2203/04804; G06F 3/0481
See application file for complete search history.

(56) References Cited

U.S. PATENT DOCUMENTS 6,871,348 B1 3/2005 Cooper
2013/0174179 A1* 7/2013 Park ...................... G06F 3/0483
718/107

(Continued)

FOREIGN PATENT DOCUMENTS

CN 103197842 7/2013
CN 104123063 10/2014

(Continued)

OTHER PUBLICATIONS

WIPO, International Search Report and Written Opinion for PCT/ CN2022/073473, Apr. 1, 2022.

(Continued)

*Primary Examiner* — Phuong H Nguyen

(74) *Attorney, Agent, or Firm* — Hodgson Russ LLP

(57) ABSTRACT

Provided are an application switching method, a terminal and a storage medium, which belong to the technical field of human-machine interaction. The method includes: displaying a first application interface of a first application in a shared floating window, where the first application is one of n foreground application each adopting a floating window-dependent display mode, and n is an integer greater than or equal to 2; receiving an application switching operation; and in response to the application switching operation, switching the first application interface displayed in the shared floating window to a second application interface of a second application, where the second application is one of the n foreground applications.

20 Claims, 15 Drawing Sheets

(56) References Cited

U.S. PATENT DOCUMENTS

| | | | |
|---|---|---|---|
| 2013/0222296 A1 | 8/2013 | Paek | |
| 2016/0334989 A1* | 11/2016 | Liu | G06F 3/04886 |
| 2020/0169596 A1 | 5/2020 | Qu et al. | |
| 2021/0397309 A1* | 12/2021 | Meng | G06F 3/04883 |
| 2022/0318036 A1* | 10/2022 | Zhang | G06F 3/0488 |

FOREIGN PATENT DOCUMENTS

| | | |
|---|---|---|
| CN | 107203305 | 9/2017 |
| CN | 107943598 | 4/2018 |
| CN | 109284041 | 1/2019 |
| CN | 110162371 | 8/2019 |
| CN | 110489043 | 11/2019 |
| CN | 110515579 | 11/2019 |
| CN | 111399715 | 7/2020 |
| CN | 111782102 | 10/2020 |
| CN | 111782332 | 10/2020 |
| CN | 112241227 | 1/2021 |
| CN | 113805744 | 12/2021 |
| WO | 2021012836 | 1/2021 |

OTHER PUBLICATIONS

Topbook, "The feature you've been clamoring for, but Microsoft won't make it official', these 5 multi-tabbed widgets are for you", retrieved from the internet: <https://www.bilibili.com/video/BV1ov4y1f7dW?from=search&seid=11119486221149349135&spm_id_from=333.337.0.0>, Feb. 2, 2021.

EPO, Extended European Search Report for EP Application No. 22748924.2, Jun. 14, 2024.

CNIPA, Second Office Action for CN Application No. 202110169218. X, Jul. 18, 2024.

CNIPA, First Office Action for CN Application No. 202110169218. X, Jan. 18, 2024.

* cited by examiner

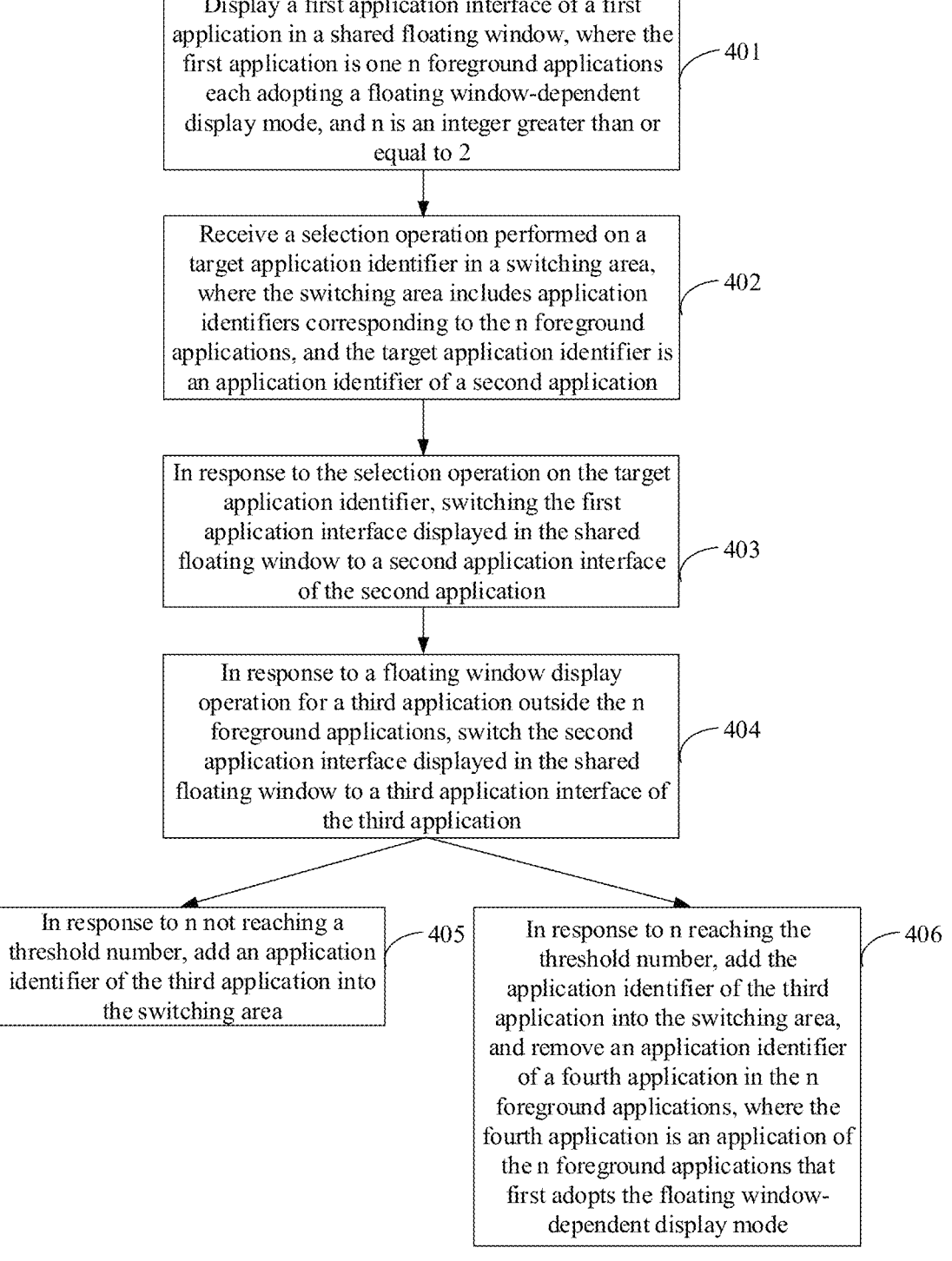

Display a first application interface of a first application in a shared floating window, where the first application is one n foreground applications each adopting a floating window-dependent display mode, and n is an integer greater than or equal to 2 — 401

Receive a selection operation performed on a target application identifier in a switching area, where the switching area includes application identifiers corresponding to the n foreground applications, and the target application identifier is an application identifier of a second application — 402

In response to the selection operation on the target application identifier, switching the first application interface displayed in the shared floating window to a second application interface of the second application — 403

In response to a floating window display operation for a third application outside the n foreground applications, switch the second application interface displayed in the shared floating window to a third application interface of the third application — 404

In response to n not reaching a threshold number, add an application identifier of the third application into the switching area — 405

In response to n reaching the threshold number, add the application identifier of the third application into the switching area, and remove an application identifier of a fourth application in the n foreground applications, where the fourth application is an application of the n foreground applications that first adopts the floating window-dependent display mode — 406

FIG. 4

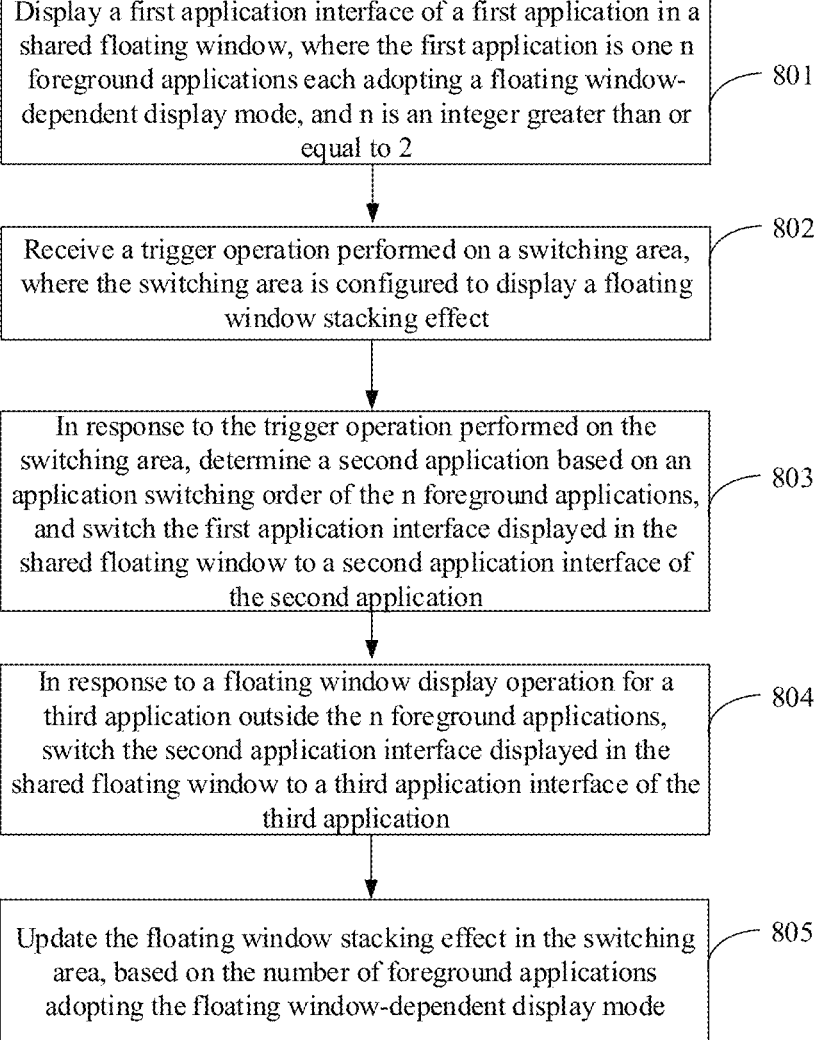

Display a first application interface of a first application in a shared floating window, where the first application is one n foreground applications each adopting a floating window-dependent display mode, and n is an integer greater than or equal to 2 — 801

Receive a trigger operation performed on a switching area, where the switching area is configured to display a floating window stacking effect — 802

In response to the trigger operation performed on the switching area, determine a second application based on an application switching order of the n foreground applications, and switch the first application interface displayed in the shared floating window to a second application interface of the second application — 803

In response to a floating window display operation for a third application outside the n foreground applications, switch the second application interface displayed in the shared floating window to a third application interface of the third application — 804

Update the floating window stacking effect in the switching area, based on the number of foreground applications adopting the floating window-dependent display mode — 805

FIG. 8

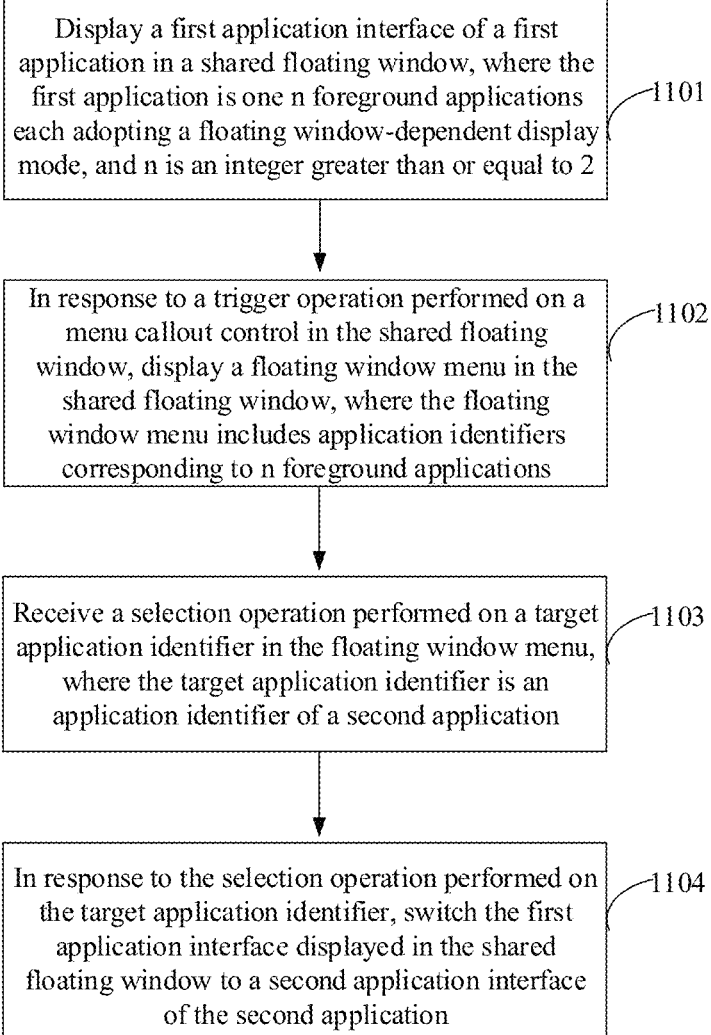

Display a first application interface of a first application in a shared floating window, where the first application is one n foreground applications each adopting a floating window-dependent display mode, and n is an integer greater than or equal to 2 —1101

In response to a trigger operation performed on a menu callout control in the shared floating window, display a floating window menu in the shared floating window, where the floating window menu includes application identifiers corresponding to n foreground applications —1102

Receive a selection operation performed on a target application identifier in the floating window menu, where the target application identifier is an application identifier of a second application —1103

In response to the selection operation performed on the target application identifier, switch the first application interface displayed in the shared floating window to a second application interface of the second application —1104

FIG. 11

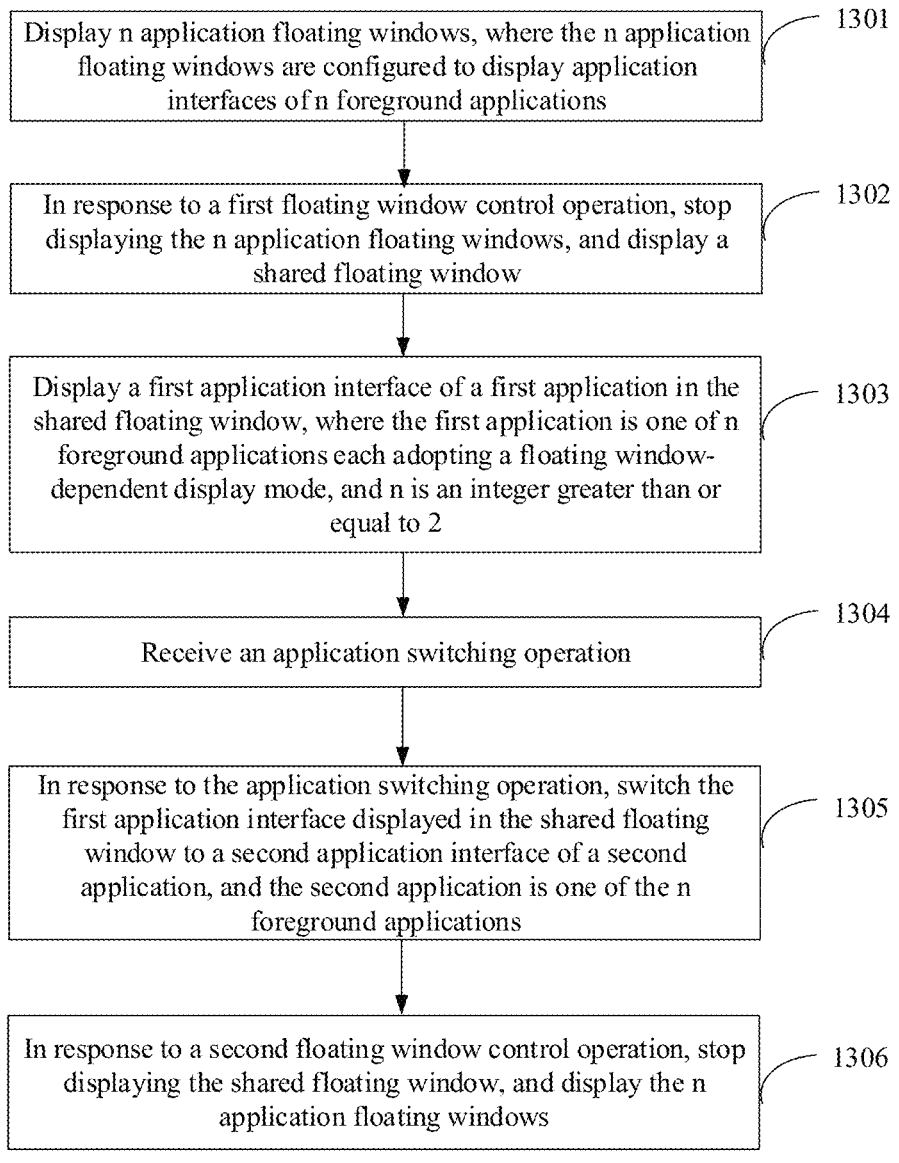

Display n application floating windows, where the n application floating windows are configured to display application interfaces of n foreground applications — 1301

In response to a first floating window control operation, stop displaying the n application floating windows, and display a shared floating window — 1302

Display a first application interface of a first application in the shared floating window, where the first application is one of n foreground applications each adopting a floating window-dependent display mode, and n is an integer greater than or equal to 2 — 1303

Receive an application switching operation — 1304

In response to the application switching operation, switch the first application interface displayed in the shared floating window to a second application interface of a second application, and the second application is one of the n foreground applications — 1305

In response to a second floating window control operation, stop displaying the shared floating window, and display the n application floating windows — 1306

FIG. 13

APPLICATION SWITCHING METHOD, TERMINAL AND STORAGE MEDIUM

CROSS-REFERENCE OF RELATED APPLICATIONS

This application is a continuation of International Application No. PCT/CN2022/073473, filed Jan. 24, 2022, which claims priority to Chinese Patent Application No. 202110169218.X, filed Feb. 7, 2021, the entire disclosures of which are incorporated herein by reference.

TECHNICAL FIELD

The present disclosure relates to the field of human-computer interaction, and in particular to an application switching method, a terminal and a non-transitory storage medium.

BACKGROUND

With the continuous development of terminal technologies, more and more applications are installed in a terminal. In a process of using the applications, a user often needs to switch between the applications.

In order to improve efficiency of switching the applications, more and more terminals support a floating window function. That is, an application interface of an application is displayed in a floating window, so that the user can perform an operation of the application through the floating window. When there is a need to switch back and forth among a plurality of applications for operation, a plurality of floating windows may be initiated to respectively display application interfaces of different applications.

SUMMARY

Embodiments of the invention provide an application switching method, a terminal and a non-transitory storage medium. And the technical solutions are illustrated as follows.

In an aspect, an embodiment of the disclosure provides an application switching method, where the application switching method includes:

displaying a first application interface of a first application in a shared floating window, where the first application is one of n foreground applications each adopting a floating window-dependent display mode, and n is an integer greater than or equal to 2;

receiving an application switching operation; and in response to the application switching operation, switching the first application interface displayed in the shared floating window to a second application interface of a second application, where the second application is one of the n foreground applications.

In another aspect, an embodiment of the present disclosure provides a terminal, where the terminal includes a processor and a memory. At least one instruction is stored in the memory, and the at least one instruction is configured to be executed by the processor to: display a first application interface of a first application in a shared floating window, where the first application is one of n foreground applications each adopting a floating window-dependent display mode, and n is an integer greater than or equal to 2; and in response to an application switching operation, switch the first application interface displayed in the shared floating window to a second application interface of a second application, where the second application is one of the n foreground applications.

In another aspect, an embodiment of the present disclosure provides a non-transitory computer-readable storage medium storing at least one instruction. The at least one instruction is configured to be executed by a processor to: display a first application interface of a first application in a shared floating window, where the first application is one of n foreground applications each adopting a floating window-dependent display mode, and n is an integer greater than or equal to 2; and in response to an application switching operation received through a switching area or a floating window menu associated with the shared floating window, switch the first application interface displayed in the shared floating window to a second application interface of a second application, where the second application is one of then foreground applications.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

FIG. 4 is a flowchart of an application switching method according to another exemplary embodiment of the present disclosure.

FIG. 8 is a flowchart of an application switching method according to another exemplary embodiment of the present disclosure.

FIG. 11 is a flowchart of an application switching method according to another exemplary embodiment of the present disclosure.

FIG. 13 is a flowchart of an application switching method according to another exemplary embodiment of the present disclosure.

DETAILED DESCRIPTION OF PREFERRED EMBODIMENTS

Figure 1:
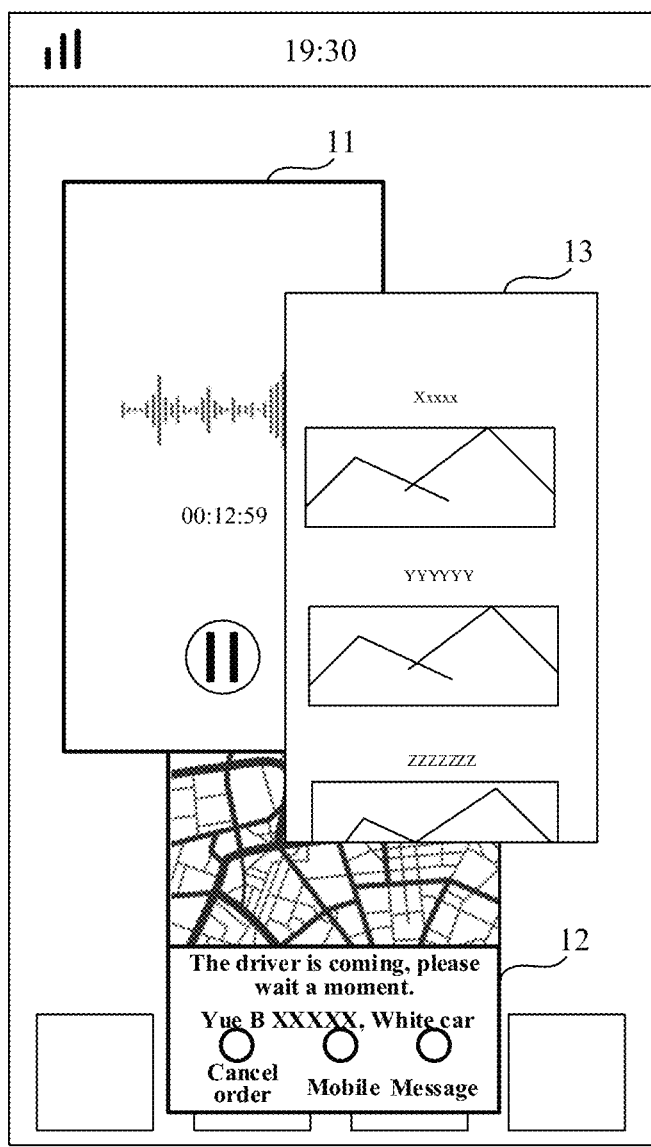
FIG. 1 is a schematic diagram illustrating an interface when multiple application floating windows are displayed in the related art.

To make the objectives, technical solutions and advantages of the present disclosure clearer, the embodiments of the disclosure are described in detail below with reference to the accompanying drawings.

The term "multiple" mentioned herein means two or more. The expression "and/or" describes an association relationship of associated objects, and it indicates that there may be three relationships. For example, A and/or B may indicate three cases: A is separately present; A and B are present at the same time, and B is separately present. The character "/" generally indicates that a preceding object and a following object that are associated are in an "or" relationship therebetween.

For ease of understanding, some terms involved in the embodiments of the present disclosure are described below.

Shared floating window: a new floating window provided by the embodiment of the present disclosure, which is different from traditional application floating windows in one-to-one correspondence with applications (that is, one application floating window displays an application interface of a corresponding application). The shared floating window is shared by multiple applications each adopting a floating window-dependent display mode (in which mode a respective application adopts a floating window for display), that is, each of the multiple applications displays its respective application interface through the shared floating window, and only an application interface of one application is displayed in the shared floating window at a time.

In some implementations, when there is only one foreground application that adopts the floating window-dependent display mode, the displaying through the shared floating window is similar to the displaying through the conventional application floating window. When there are at least two foreground applications each adopting the floating window-dependent display mode, the terminal still displays a single shared floating window (which is different from the traditional solution in which at least two application floating windows are displayed at the same time), and the user may switch, through an application switching operation, the application displayed in the shared floating window, to implement switching among applications.

In some implementations, in addition to displaying the application interface, the shared floating window further supports making a response to an operation for an application whose application interface is displayed. For example, when a news reading interface of a news reading application is displayed in the shared floating window, the user may slide up or down the news reading interface through a sliding operation. When a sound recording interface of a sound recording application is displayed in the shared floating window, the user may control a sound recording progress by clicking a sound recording control in the sound recording interface.

In some implementations, the application interface displayed in the shared floating window is a scaled-down application interface, which includes all interface elements of the application interface. Alternatively, the shared floating window displays a core interface element(s) of the application interface, and the core interface element(s) is preset by the application. For example, for car hailing application, the terminal scales down a car hailing interface of a full-screen display state, so that the scaled-down car hailing interface is displayed in the shared floating window. For the sound recording application, the terminal extracts a sound recording duration and a sound recording control (which are the core interface elements) of the sound recording interface, so that only the sound recording duration and the sound recording control are displayed in the shared floating window.

In some implementations, the shared floating window may be displayed on a system main interface, on an upper layer of a full-screen application interface, or on an upper layer of a split-screen application interface. The shared floating window is capable of being displayed simultaneously with a traditional application floating window, and an application corresponding to the shared floating window is different from an application corresponding to the application floating window.

In the related art, when there is a need to switch back and forth among multiple applications, in order to improve the efficiency of switching the applications and avoid switching back and forth the applications between foreground running and background running, the application interfaces of different applications may be respectively displayed in multiple application floating windows. Schematically, as illustrated in FIG. 1, the terminal displays a sound recording interface of a sound recording application through a first application floating window 11, displays a car hailing interface of a car hailing application through a second application floating window 12, and displays a reading interface of a news application through a third application floating window 13.

Apparently, due to the limited screen size of the terminal, the multiple application floating windows displayed simultaneously by the terminal obscure each other. In addition, the multiple application floating windows displayed in a tiled manner may obscure a background interface (such as the system main interface in FIG. 1), and the user need to adjust frequently positions of the application floating windows when he/she needs to operate an interface element in the background interface.

In order to avoid the mutual obscuration among the multiple application floating windows displayed simultaneously and reduce the obscuration of the background interface by the floating windows, the embodiments of the present disclosure provide a shared floating window. When there are at least two foreground applications each adopting the floating window display mode, the at least two foreground applications are displayed through the shared floating window, without displaying multiple application floating windows no longer. In addition, the user can switch the application displayed in the shared floating window through an application switching operation, thereby improving the efficiency of switching among applications.

Figure 2:
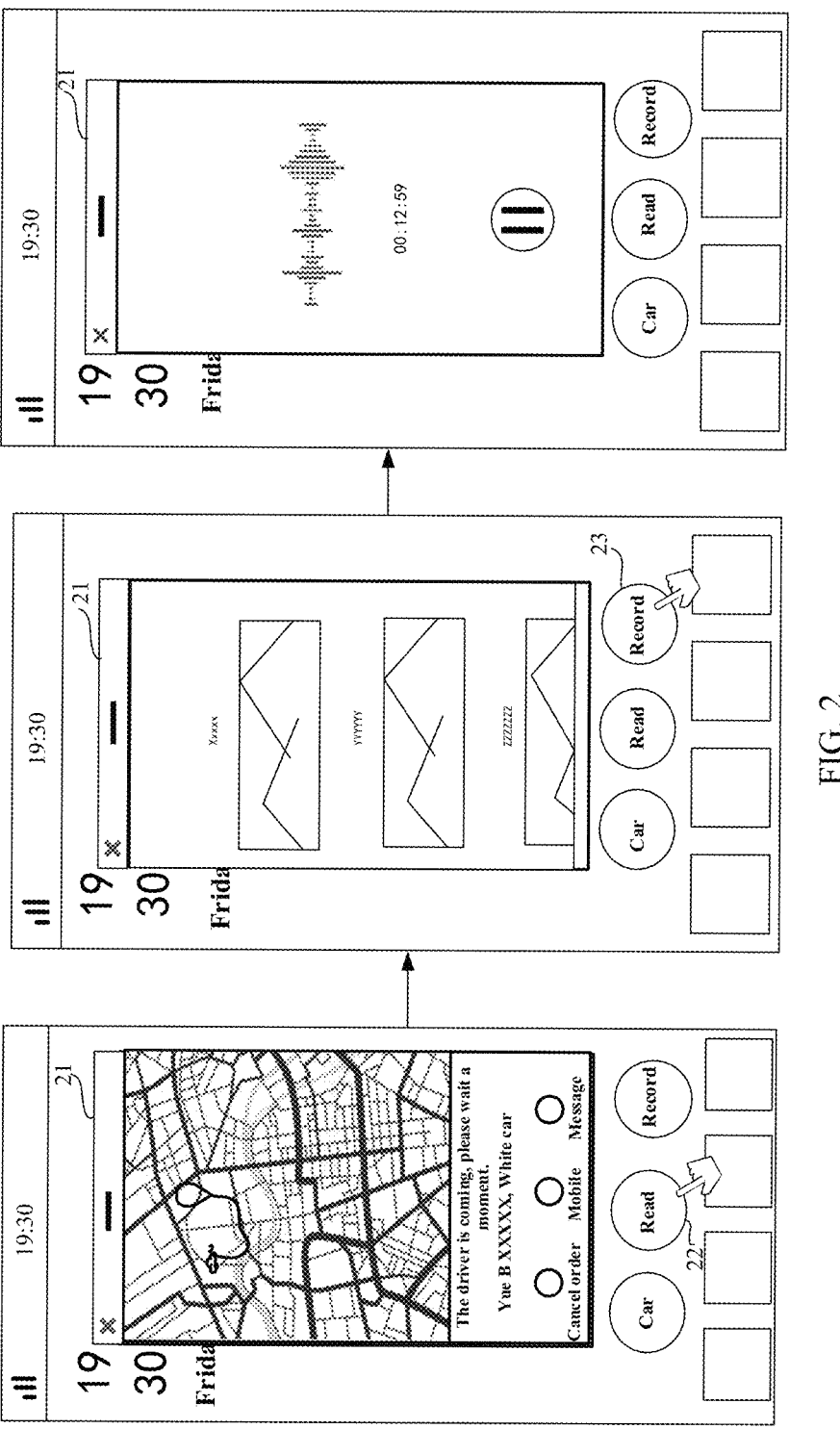
FIG. 2 is a schematic diagram illustrating interfaces in a process for switching an application according to an exemplary embodiment of the present disclosure.

As illustrated in FIG. 2, when the car hailing application, the news application, and the sound recording application each adopt the floating window-dependent display mode, the terminal displays a shared floating window 21, and displays the car hailing interface of the car hailing application in the shared floating window 21, where the reading interface of the news application and the sound recording interface of the sound recording application are not displayed temporarily. When the user needs to read a news, a news application icon 22 corresponding to the news application may be clicked to trigger the terminal to switch the car hailing interface displayed in the shared floating window 21 to the reading interface. When the user needs to record a sound, a sound recording application icon 23 corresponding to the sound recording application may be clicked to trigger the terminal to switch the reading interface displayed in the shared floating window 21 to the sound recording interface. Apparently, since the shared floating window is shared by the multiple applications, the mutual obscuration among multiple application floating windows displayed simultaneously can be avoided, the obscuration of the background interface can be reduced, which is convenient for the user to operate the interface elements in the background interface.

The application switching method provided in the embodiments of the present disclosure may be applied to a terminal having a touch screen. The terminal may be a smart phone, a tablet computer, a digital player, a smart wearable device, a personal computer, or the like, which is not limited in this embodiment of the present disclosure.

Figure 3:
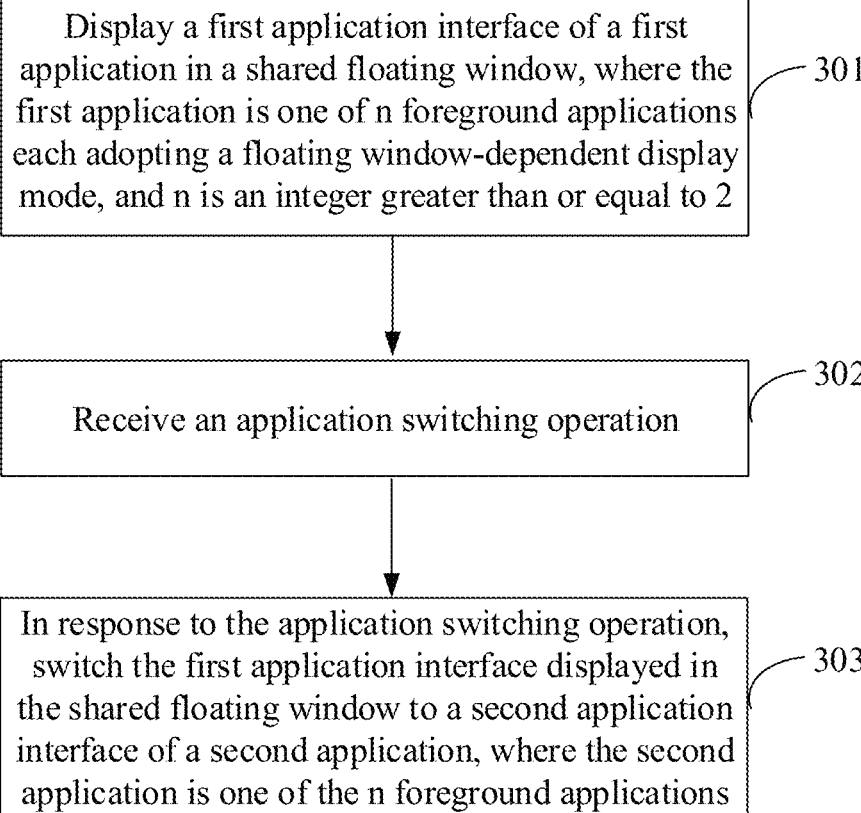
FIG. 3 is a flowchart of an application switching method according to an exemplary embodiment of the present disclosure.

As illustrated in FIG. 3, a flowchart of an application switching method according to an exemplary embodiment of the present disclosure is illustrated. The method may include blocks as follows.

At block 301, a first application interface of a first application is displayed in a shared floating window, where the first application is one of n foreground applications each of which adopts a floating window-dependent display mode, and n is an integer greater than or equal to 2.

The shared floating window may be displayed on an upper layer of a main interface, or may be displayed on an upper layer of a full-screen application interface. As illustrated in FIG. 2, the shared floating window 21 is displayed on the upper layer of the main interface.

In a possible implementation, when there are at least two foreground applications each adopting the floating window-dependent display mode, the terminal displays the shared floating window, and displays, in the shared floating window, the first application interface of the first application of the at least two foreground applications.

The n foreground applications may be different applications, or the n foreground applications may be a same application (for example, a MultRun application).

In some implementations, when there is only one foreground application adopting the floating window-dependent display mode, the terminal displays the application interface of the application through the application floating window. When receiving an operation instruction to display another application through a floating window, the terminal displays the shared floating window (the displaying of the application floating window is cancelled), and displays the application interface of the application in the shared floating window.

In some implementations, when there are n foreground applications each adopting the floating window-dependent display mode, the terminal displays by default the n foreground applications through n application floating windows. When receiving a preset instruction (to trigger and enable the shared floating window), the terminal displays the n foreground applications through the shared floating window, and cancels the displaying of the application floating windows.

In a possible implementation, there is an upper limit on the number of the foreground applications displayed in the shared floating window. For example, the upper limit is 5, that is, the shared floating window can be shared by up to 5 applications at the same time.

At block 302, an application switching operation is received.

In some implementations, the application switching operation is at least one of a touch operation, a voice triggering operation, and a gesture triggering operation, which is not limited in the embodiments.

In a possible implementation, when the application switching operation is a touch operation, a touch position of the touch operation may be located inside the shared floating window or outside the shared floating window.

For example, as illustrated in FIG. 2, when a click operation performed on an application icon outside the shared floating window 21 is received, the terminal determines that an application switching operation is received.

In another possible implementation, the terminal is a device supporting gesture recognition, and the gesture recognition means that a gesture is used as a control instruction to control the terminal to perform a specific task. In some implementations, the gesture recognition may be based on an algorithm, a neural network, or a gesture sample library. When the gesture detected by the terminal matches a preset gesture, the terminal may determine that the application switching operation is received.

In another possible implementation, the terminal is a device supporting voice recognition, and the voice recognition means that a voice is used as a control instruction to control the terminal to perform a specific task. When a voice detected by the terminal matches a preset voice, for example, when the detected voice is "switch the application", the mobile terminal may determine that the application switching operation is received.

At block 303, in response to the application switching operation, the first application interface displayed in the shared floating window is switched to a second application interface of a second application, where the second application is one of the n foreground applications.

In some implementations, based on the received application switching operation, the terminal determines from the n foreground applications a second application to be switched to, and switches the first application interface displayed in the shared floating window to the second application interface of the second application. The second application and the first application may be different applications, or may be a same application (for example, a MultRun application supporting logging with different accounts).

It is notable that, when switching the application, the terminal only switches the application displayed in the shared floating window, and there is no need to cancel the displaying of the original shared floating window and create a new shared floating window.

In a possible implementation, when the application switching operation explicitly indicates an application to be switched to, the terminal determines the application indicated by the application switching operation as the second application.

Schematically, as illustrated in FIG. 2, when a click operation performed on the news application icon 22 is received, the terminal determines the news application indicated by the news application icon 22 as the second application, so as to switch the car hailing interface displayed in the shared floating window 21 to the reading interface.

In other possible implementations, when the application switching operation only indicates switching the application and does not explicitly indicate the application to be switched to, the terminal determines, based on the first application, the second application from the n foreground applications.

By introducing the shared floating window, even if there are multiple applications each adopting the floating window display mode at the same time, since interfaces of the multiple applications are displayed through the shared floating window, the mutual obscuration among multiple tiled application floating windows is avoided, and the large area obscuration caused to the background interface is avoided. In addition, the shared floating window supports switching among applications through the application switching operation, which is convenient for the user to perform switch among the multiple applications, and the efficiency of switching an application is improved.

In conclusion, in the embodiment of the present disclosure, when there are at least two foreground applications each adopting the floating window-dependent display mode, a first application interface of a first application in the foreground applications is displayed in a shared floating window, and when an application switching operation is received, a second application interface of a second application in the foreground applications is switched and displayed in the shared floating window. In this way, switching among multiple applications each adopting the floating window-dependent display mode is enabled, and the efficiency of switching among different applications by the user is improved. Moreover, since the same shared floating window is used to display the interfaces of the foreground applications each adopting the floating window-dependent display mode, the mutual obscuration among multiple floating windows caused due to simultaneous display thereof can be avoided, and the obscuration caused by the floating windows on the background interface (the main interface or the application interface) can be reduced.

In some implementations, receiving the application switching operation includes:

receiving the application switching operation through a switching area corresponding to the shared floating window, where displaying of the switching area is associated with displaying of the shared floating window, and the switching area is located outside a display area of the shared floating window;
or,
receiving the application switching operation through a floating window menu within the shared floating window.

In some implementations, receiving the application switching operation through the switching area corresponding to the shared floating window includes:

receiving a selection operation performed on a target application identifier in the switching area, where the switching area includes application identifiers corresponding to the n foreground applications, and the target application identifier is an application identifier of the second application; and
switching the first application interface displayed in the shared floating window to the second application interface of the second application, in response to the application switching operation, includes:
in response to the selection operation performed on the target application identifier, switching the first application interface displayed in the shared floating window to the second application interface of the second application.

In some implementations, the method further includes:
in response to a floating window display operation for a third application, switching the second application interface displayed in the shared floating window to a third application interface of the third application, where the third application is outside the n foreground applications;
in response to n being smaller than a threshold number, adding an application identifier of the third application into the switching area; and
in response to n being equal to or greater than the threshold number, adding the application identifier of the third application in the switching area, and removing an application identifier of a fourth application in the n foreground applications, where the fourth application is an application of the n foreground applications that first adopts the floating window-dependent display mode.

In some implementations, the method further includes:
in response to a first application-control operation performed on an application identifier corresponding to a fifth application in the switching area, removing the application identifier corresponding to the fifth application from the switching area, and stopping the floating window-dependent display mode of the fifth application; and
in response to a second application-control operation performed on the application identifier corresponding to the fifth application in the switching area, making the application identifier corresponding to the fifth application fixedly displayed in the switching area, where the floating window-dependent display mode of the fifth application is maintained after the application identifier corresponding to the fifth application is fixedly displayed in the switching area.

In some implementations, receiving the application switching operation through the switching area corresponding to the shared floating window includes:

receiving a trigger operation performed on the switching area, where the switching area is configured to show a floating window stacking effect; and
switching the first application interface displayed in the shared floating window to the second application interface of the second application in response to the application switching operation, includes:
in response to the trigger operation performed on the switching area, determining the second application based on an application switching order of the n foreground applications, and switching the first application interface displayed in the shared floating window to the second application interface of the second application.

In some implementations, the method further includes:
in response to a floating window display operation performed on a third application, switching the second application interface displayed in the shared floating window to a third application interface of the third application, where the third application is outside then foreground applications;
based on the number of the foreground applications adopting the floating window-dependent display mode, updating the floating window stacking effect in the switching area.

In some implementations, receiving the application switching operation through the floating window menu in the shared floating window includes:

in response to a trigger operation performed on a menu callout control in the shared floating window, displaying the floating window menu in the shared floating window, where the floating window menu includes application identifiers corresponding to the n foreground applications; and receiving a selection operation performed on a target application identifier in the floating window menu, where the target application identifier is an application identifier of the second application; and switching the first application interface displayed in the shared floating window to the second application interface of the second application in response to the application switching operation, includes:

in response to the selection operation performed on the target application identifier, switching the first application interface displayed in the shared floating window to the second application interface of the second application.

In some implementations, the method further includes:

in response to a first floating window display parameter corresponding to the first application being different from a second floating window display parameter corresponding to the second application, adjusting a display state of the shared floating window based on the second floating window display parameter.

In some implementations, before displaying the first application interface of the first application in the shared floating window, the method includes:

displaying n application floating windows, where the n application floating windows are configured to display application interfaces of then foreground applications respectively; and in response to a first floating window control operation, stopping displaying of the n application floating windows, and displaying the shared floating window.

In some implementations, the method further includes:

in response to a second floating window control operation, stopping displaying of the shared floating window, and displaying the n application floating windows.

In some implementations, the method further includes:

in response to a floating window closing operation performed on the shared floating window, when there are at least two foreground applications adopting the floating window-dependent display mode, displaying a first close confirmation control and a second close confirmation control;

in response to a trigger operation performed on the first close confirmation control, closing the shared floating window and stopping the floating window-dependent display modes of the n foreground applications; and in response to a trigger operation performed on the second close confirmation control, stopping the floating window-dependent display mode of the second application.

In some implementations, the method further includes:

in response to a full-screen display operation, displaying the second application interface in full screen; and displaying the shared floating window on an upper layer of the second application interface, and switching the application interface displayed in the shared floating window, where an application interface switched to is different from the second application interface.

In practical applications, due to different display requirements of different applications, different floating window display parameters need to be used when the applications adopt the floating window-dependent display mode. For example, for the news application, a portrait floating window is needed for display, and for a game application, a landscape floating window is needed for display. Alternatively, for the news application, the floating window has a size of 600 px×900 px, and for the instant messaging application, the floating window has a size of 500 px×800 px. In a possible implementation, before switching the application interface, the terminal acquires a first floating window display parameter corresponding to the first application and a second floating window display parameter corresponding to the second application, and if the first floating window display parameter corresponding to the first application is different from the second floating window display parameter corresponding to the second application, the terminal adjusts the display state of the shared floating window based on the second floating window display parameter.

In some implementations, the floating window display parameter includes the size of the floating window, the state of the floating window such as portrait or landscape, and the like, which is not limited in the embodiments.

For the way of triggering the application switching operation, in a possible implementation, when displaying the shared floating window, the terminal displays an associated switching area in a display area outside the shared floating window. The user may perform the application switching operation through switching area, to switch the application in the shared floating window. In the following, it is described by means of an exemplary embodiment.

As illustrated in FIG. 4, a flowchart of an application switching method according to another exemplary embodiment of the present disclosure is illustrated. The method may include operations as follows.

At block 401, a first application interface of a first application is displayed in a shared floating window, where the first application is one of n foreground applications each adopting a floating window-dependent display mode, and n is an integer greater than or equal to 2.

For the process in which the terminal displays the shared floating window, reference may be made to the foregoing block 301, and details thereof are not repeated in this embodiment.

In the embodiment of the present disclosure, when there are n foreground applications each adopting the floating window-dependent display mode, the terminal displays, in addition to the shared floating window, a switching area corresponding to the shared floating window in a display area outside of the shared floating window. The switching area includes application identifiers corresponding to the n foreground applications. The application identifier may be at least one of an application icon and an application name.

In some implementations, the displaying of the switching area is associated with the displaying of the shared floating window. That is, when the display position of the shared floating window is changed, the display position of the switching area is correspondingly changed, in such a manner that a relative position of the switching area relative to the shared floating window remains unchanged. The switching area may be displayed above or below the shared floating window, or displayed on the left or right side of the shared floating window; and the relative position of the switching area relative to the shared floating window may be adjusted as required, which are not limited in the embodiments.

In some implementations, the display position of the application identifier in the switching area is related to a sequential order that the applications adopt the floating window-dependent display mode. For example, in a case where the switching area is located below the shared floating window, based on an order that the applications adopt the floating window-dependent display mode from early to late, the terminal displays, in the switching area, the application identifiers in sequence from right to left. Alternatively, when the switching area is located on the right side of the shared floating window, based on the order that the applications adopt the floating window-dependent display mode from early to late, the terminal displays, in the switching area, the application identifiers in sequence from bottom to top.

Figure 5:
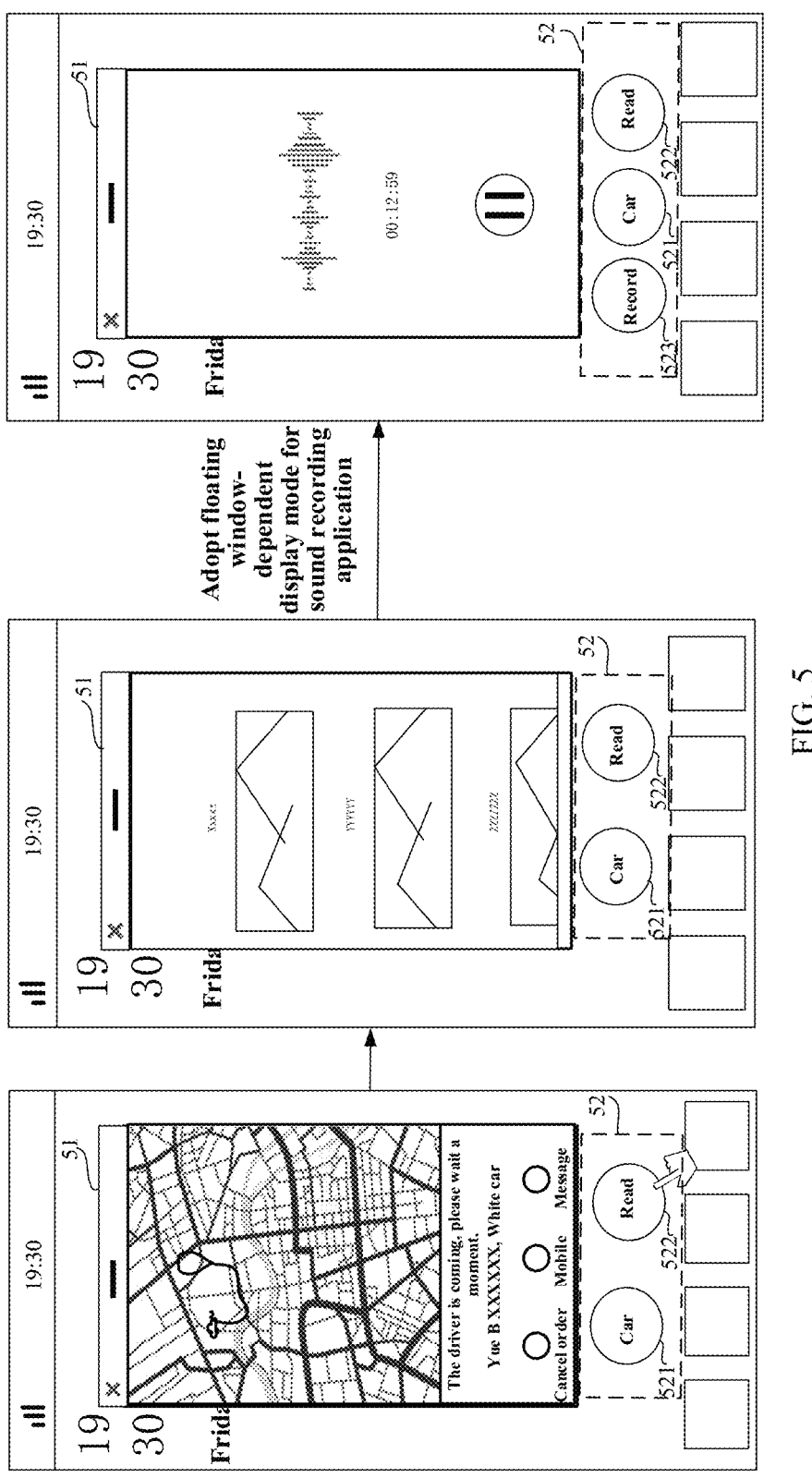
FIG. 5 is a schematic diagram illustrating interfaces in a process for adding an application according to an exemplary embodiment of the present disclosure.

Schematically, as illustrated in FIG. 5, a switching area 52 is displayed below the shared floating window 51 in an association manner, and a car hailing application icon 521 and a news application icon 522 are displayed in the switching area 52.

It is notable that, when there is only one foreground application adopting the floating window-dependent display mode, the terminal may also display the application in the shared floating window, and display the application identifier of the application in the switching area, or do not display the application identifier.

At block 402, a selection operation performed on a target application identifier in a switching area is received, where the switching area includes application identifiers corresponding to the n foreground applications, and the target application identifier is an application identifier of the second application.

When the user wants to switch the application displayed in the shared floating window, the switching of the application may be triggered by selecting an application identifier in the switching area. In a possible implementation, the terminal receives the selection operation performed on the target application identifier in the switching area, and determines a foreground application corresponding to the target application identifier as the second application.

The selection operation may be a single-click operation, a double-click operation, a long-press operation, a press operation, and the like, which is not limited in the embodiments.

Schematically, when there is a need to perform the switching to display a reading interface of the news application, the user may click the news application icon 522 in the switching area 52. Correspondingly, the terminal receives the click operation performed on the news application icon 522, and determines the news application as the application to be switched to.

At block 403, in response to the selection operation performed on the target application identifier, the first application interface displayed in the shared floating window is switched to the second application interface of the second application.

Further, the terminal switches the first application interface displayed in the shared floating window to the second application interface, based on the selection operation. Schematically, as illustrated in FIG. 5, after receiving the click operation performed on the news application icon 522, the terminal switches the car hailing interface displayed in the shared floating window 51 to the reading interface.

In some implementations, after the application is switched, the display order of the application identifiers in the switching area is not changed.

Apparently, by displaying, in the switching area, the application identifiers of the foreground applications each adopting the floating window-dependent display mode, the user can quickly trigger the switching to a specified application by selecting an application identifier, thereby improving the efficiency of application switching.

In an actual application scenario, in addition to the existing applications each adopting the floating window-dependent display mode, the user may add an application adopting the floating window-dependent display mode. Correspondingly, the terminal needs to update the display contents of the shared floating window and the switching area, based on the user's operation. The updating, by the terminal, the display contents of the shared floating window and the switching area may include blocks 404 to 406.

At block 404, in response to a floating window display operation for a third application, the second application interface displayed in the shared floating window is switched to a third application interface of the third application, where the third application is outside the n foreground applications.

In a possible implementation, through the floating window display operation, the user may trigger the terminal to adopt the floating window-dependent display mode for the third application where the third application is not one of the n foreground applications. The floating window display operation is used to instruct the third application to be displayed through a floating window.

In some implementations, the floating window display operation may include an application startup operation to startup the third application, and a trigger operation to trigger the third application to adopt the floating window-dependent display mode. Alternatively, the floating window display operation may include a floating window callout operation and a selection operation on the third application. The specific operation manner of the floating window display operation is not limited in the embodiments.

Generally, the third application for which the floating window display operation is performed is usually an application that the user wants to process immediately. Therefore, based on the floating window display operation, the terminal switches the second application interface displayed in the shared floating window to the third application interface of the third application.

For example, as illustrated in FIG. 5, when receiving a floating window display operation for the sound recording application, the terminal switches the reading interface displayed in the shared floating window 51 to the sound recording interface of the sound recording application.

In a possible implementation, in order to facilitate the user to know the currently displayed application in the shared floating window, the terminal highlights the application identifier corresponding to the currently displayed application in the switching area. The highlighting may be performed in at least one way of the following: displaying at low transparency (whereas other application identifiers are displayed at high transparency display); displaying at high brightness; displaying not in gray scale (whereas other application identifiers are displayed in gray scale); displaying with strokes; displaying at an enlarged size, etc., which is not limited in the embodiments.

To facilitate the user to perform the application switching subsequently, the terminal adds an application identifier of the third application to the switching area. In a possible implementation, due to the limited display size of the switching area, there is an upper limit on the number of the application identifiers in the switching area. Therefore, when adding the application identifier in the switching area, the terminal needs to detect whether the number of the existing application identifiers in the switching area reaches a threshold number. If the threshold number is not reached, the following block 405 is performed; and if the threshold number is reached, the following block 406 is performed.

At block 405, in response to n not reaching the threshold number, the application identifier of the third application is added in the switching area.

In a possible implementation, the application identifiers are displayed in the switching area based on a sequential order that the applications adopt the floating window-dependent display mode. And if the number of the existing application identifiers in the switching area does not reach the threshold number, the terminal directly displays the application identifier of the third application in the switching area.

Schematically, as illustrated in FIG. 5, in a case where the terminal displays, based on the order that the applications adopt the floating window-dependent display mode from early to late, the application identifiers in sequence in the switching area 52 from right to left, when the floating window display operation for the sound recording application is received, and the number (two) of the existing application identifiers in the switching area 52 does not reach the threshold number (for example, five), the terminal displays the sound recording application icon 523 on the left side of the car hailing application icon 521.

At block 406, in response to n reaching the threshold number, the application identifier of the third application is added into the switching area, and an application identifier of a fourth application of the n foreground applications is removed, where the fourth application is an application of the n foreground applications that first adopts the floating window-dependent display mode.

In a possible implementation, the application identifiers are displayed in the switching area based on the sequential order that the applications adopt the floating window-dependent display mode. And if the number of the existing application identifiers in the switching area reaches the threshold number, the terminal removes, from the switching area, the application identifier of the fourth application that first adopts the floating window-dependent display mode, and adds the application identifier of the third application to the switching area.

In a schematic example, the sequential order that the existing applications in the switching area adopt the floating window-dependent display mode is as follow: a news application, an instant messaging application, a car hailing application, a video application, and a game application from early to late. When a floating window display operation for a sound recording application is received, because the number of the existing applications in the switching area reaches the threshold number, the terminal determines the news application as an application to be removed from the switching area.

In some implementations, the removed fourth application is switched to run in the background, or the removed fourth application still keeps running in the foreground. The user may perform a sliding operation in the switching area, to resume the displaying the application identifier of the fourth application in the switching area.

In other possible implementations, besides the way of determining, based on the sequential order of adopting the floating window-dependent display mode, the fourth application to be removed, the terminal may further determine, based on the usage frequency of each application of the n foreground applications (that is, the frequency at which each application is displayed in the shared floating window), an application with the lowest usage frequency as the fourth application. Alternatively, based on a relevance of each of the n foreground applications to the third application, the terminal determines an application with the lowest relevance as the fourth application. This is not limited in the embodiments.

In the embodiments, by displaying the switching area outside the shared floating window in an association manner, and displaying the application identifiers of the applications in the switching area, the user can quickly switch to a specified application by triggering the application identifier, thereby further improving the efficiency and accuracy of the application switching.

In addition, when there is a need to adopt the floating window-dependent display mode for other applications, the terminal determines, based on the number of the existing application identifiers in the switching area, whether there is a need to remove a part of application identifiers from the switching area. This avoids displaying too many application identifiers in the switching area at the same time, thereby improving the accuracy of subsequently selecting an application identifier.

In order to avoid an important application concerned by the user from being removed, in a case where multiple applications each adopting the floating window-dependent display mode are started, the user may perform an operation on the application identifiers in the switching area to remove a specified application identifier from the switching area to ensure that the application identifier of the important application can be reserved in the switching area when a new application identifier is added.

In a possible implementation, in response to a first application-control operation performed on an application identifier corresponding to a fifth application in the switching area, the terminal removes the application identifier corresponding to the fifth application from the switching area, and stops the floating window-dependent display mode of the fifth application.

In some implementations, the application identifier displayed in the switching area supports at least one application-control operation. When receiving the first application-control operation performed on an application identifier, the terminal determines that the floating window-dependent display mode of an application corresponding to the application identifier needs to be canceled. Accordingly, the application identifier is removed from the switching area, and the floating window-dependent display mode of the application is stopped (that is, it is no longer able to perform switching to display the application interface of the application in the shared floating window by triggering the application identifier).

The first application-control operation may be a drag operation performed on the application identifier in a first direction. For example, the first application-control operation is an upward dragging operation that drags an application identifier upward. The specific operation manner of the first application-control operation is not limited in the embodiments of the present disclosure.

Figure 6:
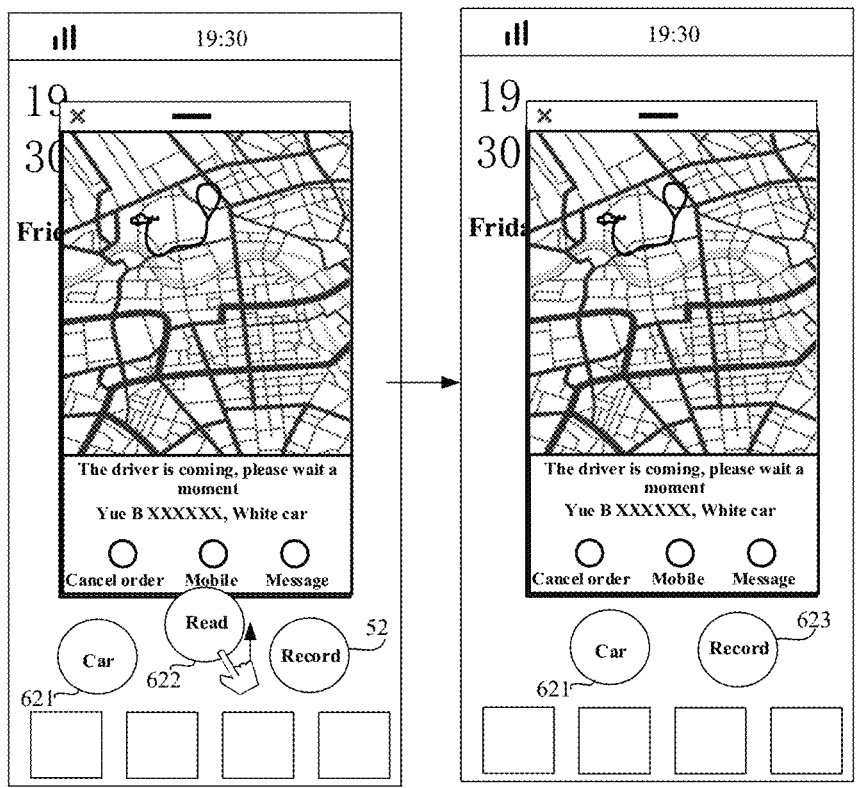
FIG. 6 is a schematic diagram illustrating interfaces in a process for removing an application according to an exemplary embodiment of the present disclosure.

Schematically, as illustrated in FIG. 6, a car hailing application icon 621, a news application icon 622, and a sound recording application icon 623 are currently displayed in the switching area. When receiving an upward dragging operation performed on the news application icon 622, the terminal removes the news application icon 622 from the switching area, and adjusts the display positions of the car hailing application icon 621 and the sound recording application icon 623. In a case where the upper limit of the number of the application identifiers in the switching area is 3, since the news application icon 622 is removed, the sound recording application icon 623 (the time at which the sound recording application adopts the floating window-dependent display mode is the earliest) will not be removed even if other applications subsequently are enabled to adopt the floating window-dependent display mode.

In another possible implementation, the user may also perform an application-control operation to make a specified application identifier fixedly displayed in the switching area. In response to a second application-control operation performed on the application identifier corresponding to the fifth application in the switching area, the application identifier corresponding to the fifth application is fixedly displayed in the switching area, where the floating window-dependent display mode of the fifth application is maintained after the application identifier corresponding to the fifth application is fixedly displayed in the switching area.

In some implementations, when receiving the second application-control operation performed on an application identifier, the terminal determines that the floating window-dependent display mode of an application corresponding to the application identifier needs to be maintained. Accordingly, the application identifier is fixedly displayed in the switching area. After the application identifier is fixedly displayed, the fixedly displayed application identifier would not be removed, even if the number of the application identifiers in the switching area subsequently reaches the threshold number, and even if the time at which the application, corresponding to the fixedly displayed application identifier, adopts the floating window-dependent display mode is the earliest.

The second application-control operation may be a drag operation performed on the application identifier in a second direction. For example, the second application-control operation is a downward dragging operation that drags an application identifier downward. The specific operation manner of the second application-control operation is not limited in the embodiments of the present disclosure.

In some implementations, the terminal displays a fixed identifier (for example, displaying a corner mark) on the periphery of the fixedly displayed application identifier, to prompt the user that the application identifier is fixed in the switching area.

Figure 7:
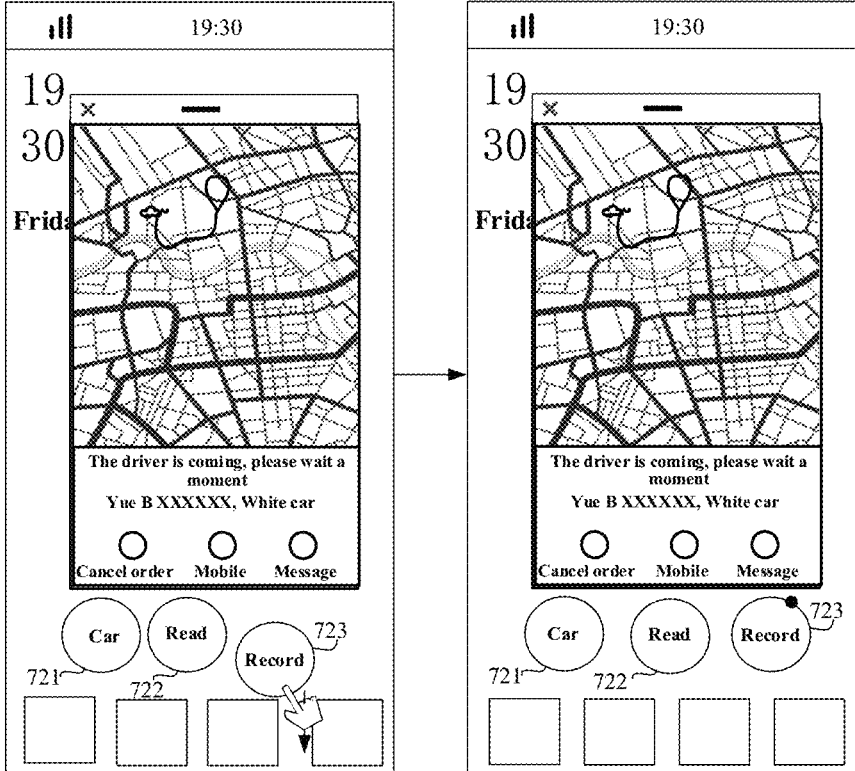
FIG. 7 is a schematic diagram illustrating interfaces in a process for fixing an application according to an exemplary embodiment of the present disclosure.

Schematically, as illustrated in FIG. 7, a car hailing application icon 721, a news application icon 722, and a sound recording application icon 723 are currently displayed in the switching area. When receiving a downward dragging operation performed on the sound recording application icon 723, the terminal makes the sound recording application icon 723 fixed (which is labeled by a corner mark) in the switching area. In a case where the upper limit of the number of the application identifiers in the switching area is 3, since the sound recording application icon 723 is fixedly displayed, the sound recording application icon 723 (the time at which the sound recording application adopts the floating window-dependent display mode is the earliest) is not removed even if other applications are subsequently enabled to adopt the floating window-dependent display mode.

In some embodiment, when the first application-control operation for the fixed displayed application identifier is received, the terminal releases the fixed displaying of the application identifier.

In the embodiment, by performing the application-control operations on the application identifiers displayed in the switching area, a specified application identifier may be removed; or the specified application identifier may be fixedly displayed in the switching area, which avoids removing of a started important application that would be caused due to startup of a new application.

In the foregoing embodiments, since the application identifiers are displayed in the switching area, the user can quickly switch to a specified application by selecting the application identifier. In another possible implementation, the terminal may implement the application switching by means of an implicit indication that designates an application switching operation for an application. In the following, it is described by means of an exemplary embodiment.

As illustrated in FIG. 8, a flowchart of an application switching method according to another exemplary embodiment of the present disclosure is illustrated. The method may include the following blocks.

At block 801, a first application interface of a first application is displayed in a shared floating window, where the first application is one of n foreground applications each adopting a floating window-dependent display mode, and n is an integer greater than or equal to 2.

For a process in which the terminal displays the shared floating window, reference may be made to foregoing block 301, and details thereof are not repeated in this embodiment.

In the embodiment of the present disclosure, when there are n foreground applications each adopting a floating window-dependent display mode, the terminal displays, in addition to the shared floating window, a switching area corresponding to the shared floating window in a display area outside of the shared floating window. The switching area does not directly display application identifiers of the n foreground applications, but shows a stacking effect of multiple application floating windows, which implies that there are multiple applications each adopting the floating window-dependent display mode.

The displaying of the switching area is associated with the displaying of the shared floating window. That is, when the display position of the shared floating window is changed, the display position of the switching area is correspondingly changed, in such a manner that a relative position of the switching area relative to the shared floating window remains unchanged. The switching area may be displayed above or below the shared floating window, or displayed on the left side or the right side of the shared floating window, which is not limited in the embodiments.

In a possible implementation, the switching area displays a floating window stacking effect through a preset floating window stacking effect diagram. Different numbers of the floating windows correspond to different floating window stacking effect diagrams, or different numbers of the floating windows correspond to a same floating window stacking effect diagram.

Figure 9:
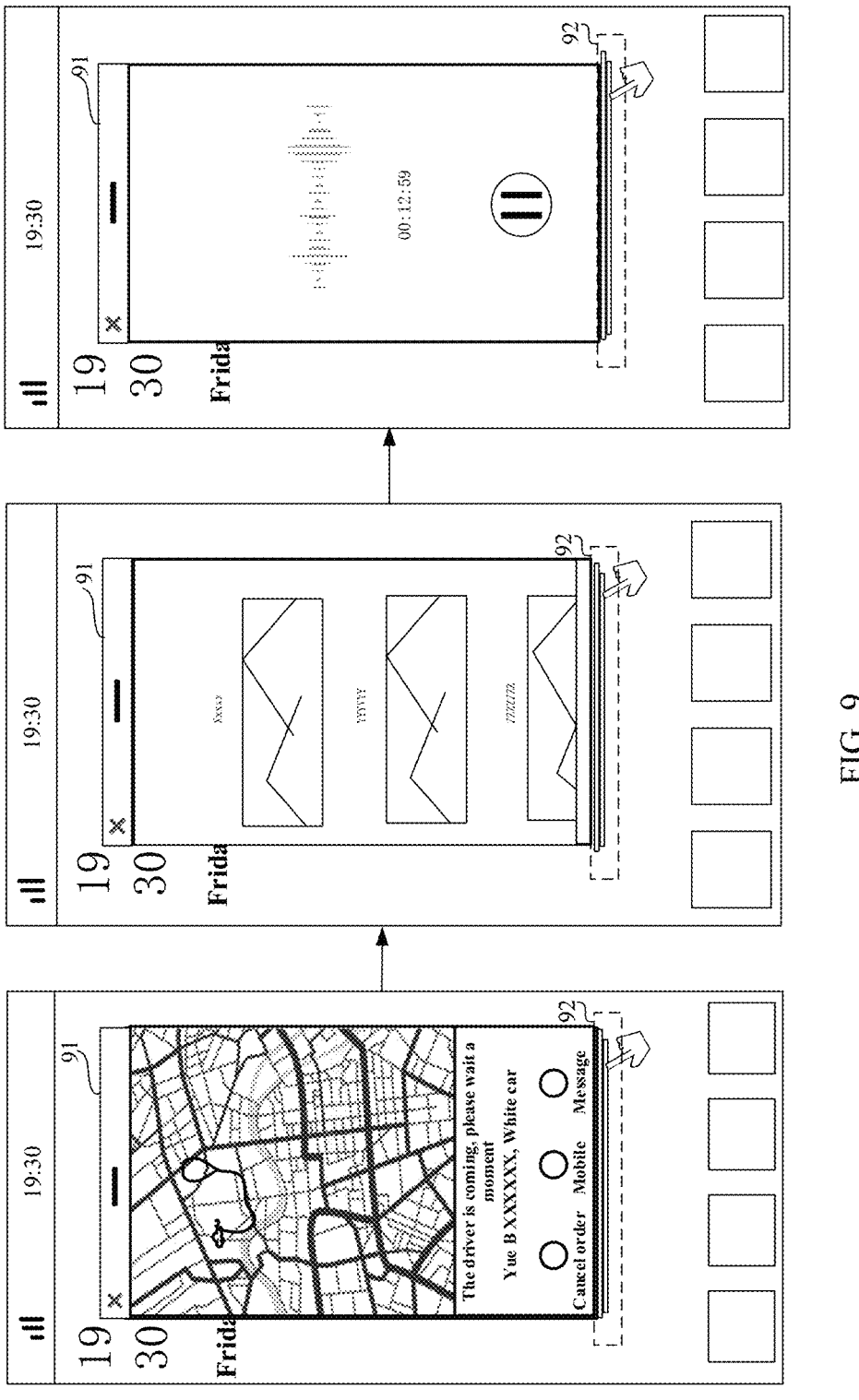
FIG. 9 is a schematic diagram illustrating interfaces in a process for switching an application according to another exemplary embodiment of the present disclosure.

For example, as illustrated in FIG. 9, when the applications adopting the floating window-dependent display mode include a car hailing application, a news application, and a sound recording application, the terminal displays a floating window stacking effect diagram in the switching area 92 below the shared floating window 91.

At block 802, a trigger operation performed on the switching area is received, where the switching area is configured to display a floating window stacking effect.

Different from the foregoing embodiments in which the application identifier needs to be selected to trigger the application switching, in this embodiment, the user only needs to perform a trigger operation on the switching area, for triggering the shared floating window to switch the application interface.

The trigger operation performed on the switching area may be a single-click operation, a double-click operation, a long-press operation, a sliding operation, a press operation, and the like, and the specific form of the trigger operation is not limited in the embodiments of the present disclosure.

Schematically, as illustrated in FIG. 9, when the car hailing interface currently displayed in the shared floating window 91 needs to be switched, the user may click the switching area 92.

At block 803, in response to a trigger operation performed on the switching area, a second application is determined based on an application switching order of the n foreground applications and the first application interface displayed in the shared floating window is switched to a second application interface of the second application.

Since the trigger operation performed on the switching area only indicates that the application switching needs to be performed, and it unable to explicitly indicate an application to be switched to, the terminal needs to determine the second application to-be-switched to, based on the application switching sequence of the n foreground applications.

In a possible implementation, the application switching sequence is determined based on a sequential order that the n foreground applications adopts the floating window-dependent display mode. Correspondingly, based on the received trigger operation, the terminal determines an application that precedes or follows the first application in the application switching sequence, as the second application.

Schematically, as illustrated in FIG. 9, the application switching sequence is car hailing application→news application→sound recording application, and in a case where the car hailing interface of the car hailing application is currently displayed in the shared floating window 91, when a click operation performed on the switching area 92 is received, the terminal switches the car hailing interface in the shared floating window 91 to the reading interface of the news application. When the click operation performed on the switching area 92 is received again, the terminal switches the reading interface in the shared floating window 91 to the sound recording interface of the sound recording application. When the click operation performed on the switching area 92 is received again, the terminal switches the sound recording interface in the shared floating window 91 to the car hailing interface.

In an actual application scenario, in addition to the existing applications adopting the floating window-dependent display mode, the user may add an application adopting the floating window-dependent display mode. Correspondingly, the terminal needs to update the display content in the shared floating window and the display content in the switching area, based on the user's operation. The updating, by the terminal, the display content in the shared floating window and the display content in the switching area may include blocks 804 to 805.

At block 804, in response to a floating window display operation for a third application, the second application interface displayed in the shared floating window is switched to a third application interface of the third application, where the third application is outside the n foreground applications.

In a possible implementation, through the floating window display operation, the user may trigger the terminal to adopt the floating window-dependent display mode for the third application, where the third application is not one of the n foreground applications. The floating window display operation is configured to instruct the third application to be displayed through a floating window.

In some implementations, the floating window display operation may include an application startup operation to trigger the third application, and a trigger operation to trigger the third application to adopt the floating window-dependent display mode. Alternatively, the floating window display operation may include a floating window callout operation and a selection operation on the third application. The specific operation manner of the floating window display operation is not limited in the embodiments.

Generally, the third application for which the floating window display operation is performed is usually an application that the user wants to process immediately. Therefore, based on the floating window display operation, the terminal switches the second application interface displayed in the shared floating window to the third application interface of the third application.

Figure 10:
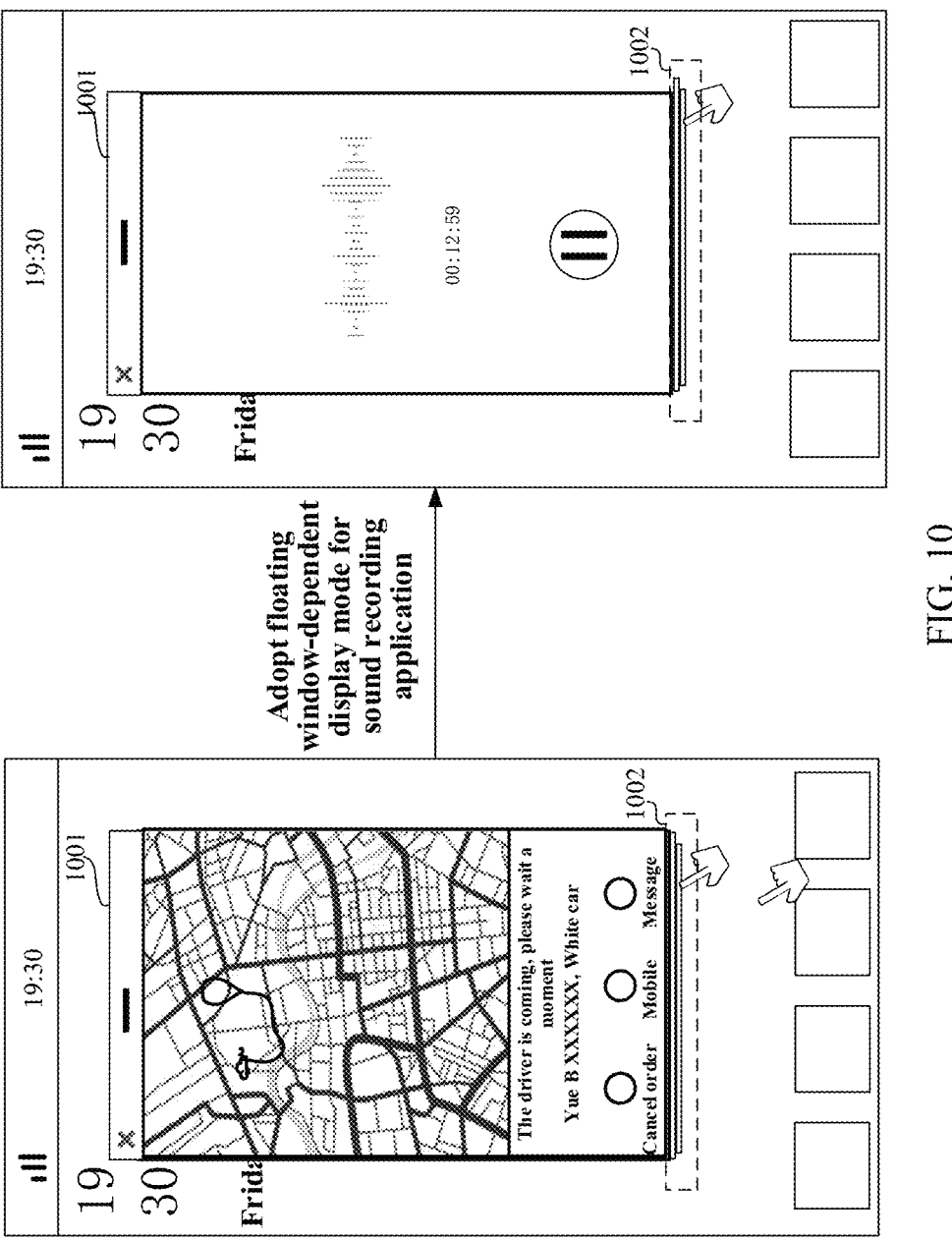
FIG. 10 is a schematic diagram illustrating interfaces in a process for adding an application according to another exemplary embodiment of the present disclosure.

For example, as illustrated in FIG. 10, when receiving a floating window display operation for the sound recording application, the terminal switches the car hailing interface displayed in the shared floating window 1001 to the sound recording interface of the sound recording application.

At block 805, the floating window stacking effect in the switching area is updated, based on the number of the foreground applications adopting the floating window-dependent display mode.

In order to simulate the stacking effect of multiple application floating windows more truly, in a possible implementation, the terminal may update the floating window stacking effect in the switching area, based on the number (i.e., n+1) of the foreground applications adopting the floating window-dependent display mode.

In some implementations, the terminal stores floating window stacking effect diagrams respectively corresponding to different numbers. The terminal acquires a floating window stacking effect diagram corresponding to the number (n+1), and displays the acquired floating window stacking effect diagram in the switching area, to simulate an effect of increasing the application floating windows.

In some implementations, different numbers correspond to different floating window stacking effect diagrams, and there is an upper limit for the number. After the upper limit for the number is reached, different numbers correspond to a same floating window stacking effect diagram.

Schematically, as illustrated in FIG. 10, when there are two foreground applications adopting the floating window-dependent display mode, the terminal displays an effect diagram of stacking two floating windows in the switching area 1002. When a foreground application adopting the floating window-dependent display mode is newly added, the terminal displays an effect diagram of stacking three floating windows in the switching area 1002. When a foreground application adopting the floating window-dependent display mode is further added, the terminal keeps displaying the effect diagram of stacking three floating windows in the switching area 1002.

It is notable that, when the number of the foreground applications adopting the floating window-dependent display mode is reduced, the terminal may update the floating window stacking effect in the switching area, based on the reduced number, which will not be detailed herein.

In the embodiment, the floating window stacking effect is shown in the switching area located at the periphery of the shared floating window. In addition, when the trigger operation performed on the switching area is received, the application is switched based on the display order of the applications. In this way, the obscuration by the switching area on the background interface is further reduced, while the application switching is enabled.

In the foregoing embodiment, it is illustrated by taking a case where the application switching is performed by using the switching area outside the shared floating window, as an example. In other possible implementations, the terminal receives the application switching operation through a floating window menu in the shared floating window, which does not need to display the switching area outside the share floating window. In this way, the obscuration to the background interface that is caused due to the displayed shared floating window is further reduced. In the following, it is described by means of an exemplary embodiment.

As illustrated in FIG. 11, a flowchart of an application switching method according to another exemplary embodiment of the present disclosure is illustrated. The method may include the following blocks.

At block 1101, a first application interface of a first application is displayed in a shared floating window, where the first application is one of n foreground applications each adopting a floating window-dependent display mode, and n is an integer greater than or equal to 2.

For a process in which the terminal displays the shared floating window, reference may be made to the foregoing block 301, and details thereof are not repeated in this embodiment.

At block 1102, in response to a trigger operation performed on a menu callout control in the shared floating window, a floating window menu is displayed in the shared floating window, where the floating window menu includes application identifiers corresponding to the n foreground applications.

In a possible implementation, a menu callout control is provided in the shared floating window, to facilitate the subsequent application switching. When a trigger operation performed on the menu callout control is received, the terminal displays a floating window menu in the shared floating window, where the floating window menu includes application identifiers corresponding to the n foreground applications currently adopting the floating window-dependent display mode.

In some embodiments, the menu callout control is provided in a floating window operation area of the shared floating window, and the floating window operation area may be located at the top, the bottom, the left side or the right side of the shared floating window, which is not limited in the embodiments.

In some embodiments, in addition to the application identifiers, the floating window menu may further display other controls, such as a full-screen control, and a suspend control, which is not limited in the embodiments.

Figure 12:
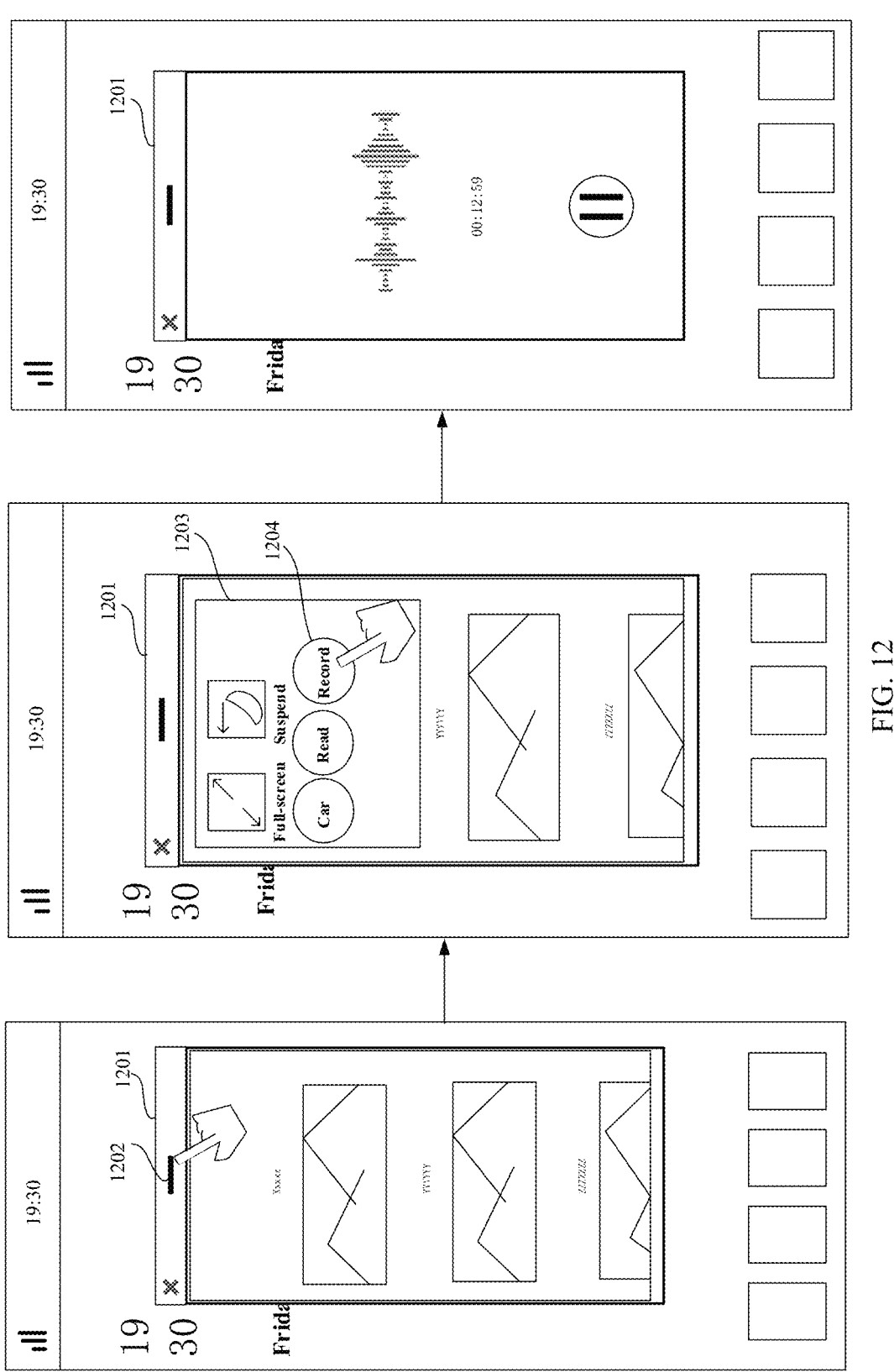
FIG. 12 is a schematic diagram illustrating interfaces in a process for switching an application according to another exemplary embodiment of the present disclosure.

Schematically, as illustrated in FIG. 12, when receiving a click operation performed on the menu callout control 1202 in the shared floating window 1201, the terminal displays the floating window menu 1203 in the shared floating window 1201, and the floating window menu 1203 displays application icons of the foreground application currently adopting the floating window-dependent display mode.

At block 1103, a selection operation performed on a target application identifier in the floating window menu is received, where the target application identifier is an application identifier of a second application.

Further, the user may trigger the application switching by selecting an application identifier in the floating window menu. Correspondingly, the terminal receives the selection operation performed on the target application identifier in the floating window menu, and determines an application corresponding to the target application identifier as the second application to be switched to.

For example, as illustrated in FIG. 12, when a click operation performed on the sound recording application icon 1204 in the floating window menu 1203 is received, the terminal determines that the sound recording application is the application to be switched to.

At block 1104, in response to the selection operation performed on the target application identifier, the first application interface displayed in the shared floating window is switched to a second application interface of the second application.

Further, the terminal switches the first application interface displayed in the shared floating window to the second application interface, and closes the floating window menu. The user may subsequently repeat the foregoing operations to perform further application switching.

Schematically, as illustrated in FIG. 12, the terminal switches the reading interface displayed in the shared floating window 1201 to the sound recording interface of the sound recording application, and closes the floating window menu 1203.

In the embodiments, a callout control for the floating window menu is provided in the shared floating window. As such, the floating window menu is called out in the shared floating window through the control, and the application switching is enabled by selecting the application identifier displayed in the floating window menu. Since the floating window menu is displayed within the shared floating window, the obscuration to the background interface can be further reduced.

In some application scenarios, the user may need to perform a full-screen display operation on an application adopting the floating window-dependent display mode. In a possible implementation, in response to a full-screen display operation, the second application interface is displayed in full screen. The full-screen display operation may be triggered by a full-screen control in the floating window menu.

While the second application interface is displayed in full screen, the terminal displays the shared floating window on the upper layer of the second application interface, and switches the application interface displayed in the shared floating window, where the application interface switched to is different from the second application interface.

In some implementations, the terminal updates the application identifiers displayed in the switching area corresponding to the shared floating window (for example, the application identifier corresponding to the second application is removed), or updates the floating window stacking effect in the switching area.

In some application scenarios, the user may need to view, on the same screen, at least two related applications. In this case, in order to meet the actual needs of the user in different scenarios, in a possible implementation, based on a floating window control operation, the terminal may perform switching between two display modes, i.e., the shared floating window-dependent display mode and a multi-application floating window-dependent display mode. In the following, it is described by means of an exemplary embodiment.

As illustrated in FIG. 13, a flowchart of an application switching method according to another exemplary embodiment of the present disclosure is illustrated. The method may include the following blocks.

At block 1301, n application floating windows are displayed, where then application floating windows are configured to display application interfaces of n foreground applications.

In a possible implementation, by default, when there are n foreground applications that need to adopt the floating window-dependent display mode, the terminal starts n application floating windows, and displays the application interfaces of then foreground applications through the n application floating windows respectively. The n application floating windows are displayed in a tile manner, and there may be mutual obscuration among the n application floating windows, or they may not obscure each other. The user may adjust a display position and a size of each application floating window through a drag operation.

Figure 14:
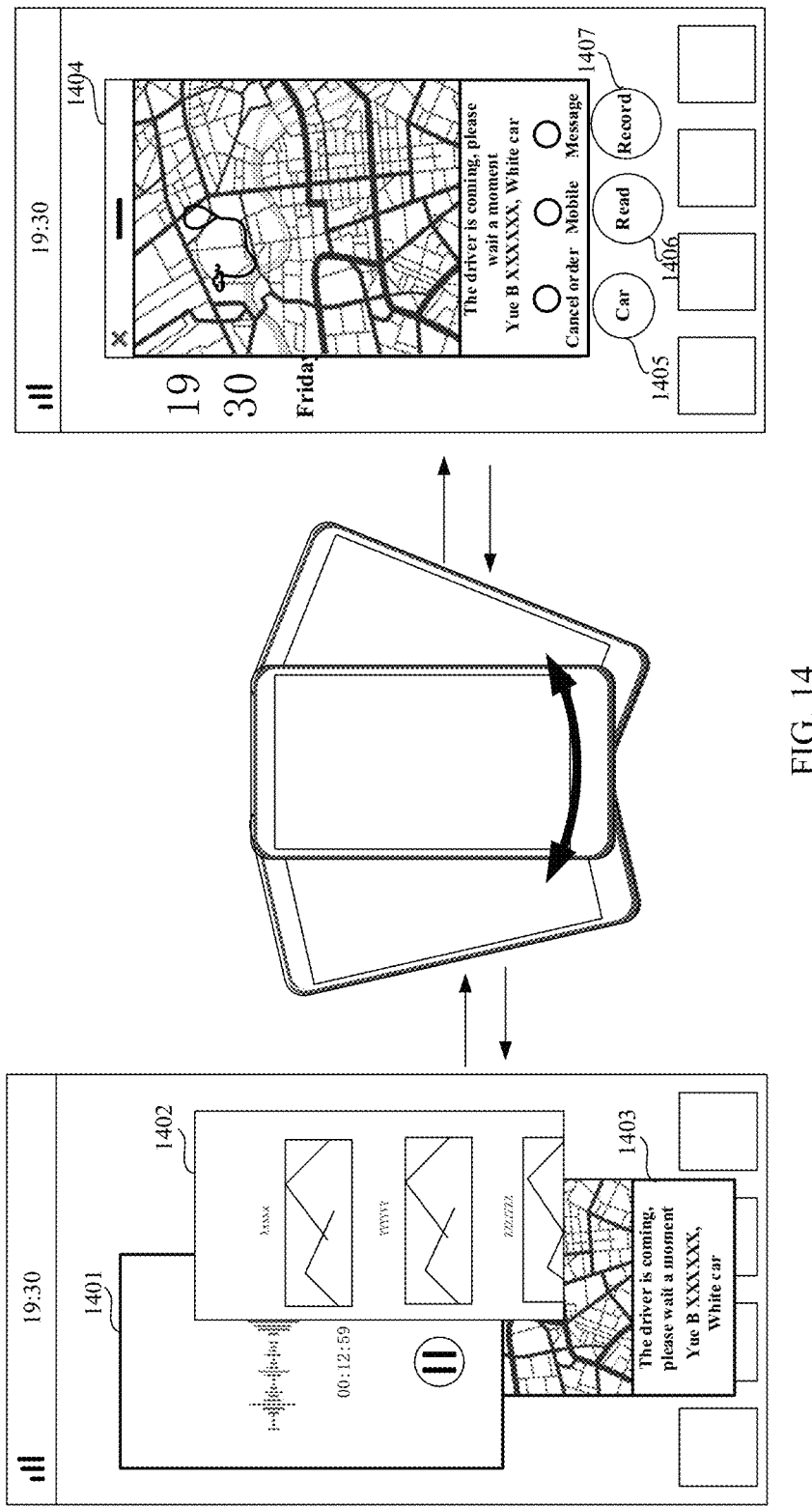
FIG. 14 is a schematic diagram illustrating interfaces in a process for switching a floating window display mode according to another exemplary embodiment of the present disclosure.

Schematically, as illustrated in FIG. 14, the terminal displays the sound recording interface of the sound recording application in a first application floating window 1401, displays the reading interface of the news application in a second application floating window 1402, and displays the car hailing interface of the car hailing application in a third application floating window 1403.

At block 1302, in response to a first floating window control operation, the displaying of the n application floating windows is stopped, and a shared floating window is displayed.

In a possible implementation, the terminal sets the first floating window control operation as a trigger operation to trigger switching from "the multi-application floating window display mode" to "the shared floating window display mode". The first floating window control operation may be a voice control operation, a gesture control operation, or a touch operation, which is not limited in the embodiments.

When the first floating window control operation is received, it is indicated that the user wants to organize the n application floating windows. This triggers stopping of the displaying of the n application floating windows, and causes the shared floating window to be displayed.

For example, as illustrated in FIG. 14, when the user shakes the terminal, the terminal determines that the first floating window control operation is received. Accordingly, the terminal stops displaying the application floating windows, and display the shared floating window 1404. A car hailing application icon 1405, a news application icon 1406, and a sound recording application icon 1407 are displayed in the switching area below the shared floating window 1404.

At block 1303, a first application interface of a first application is displayed in the shared floating window, where the first application is one of the n foreground applications each adopting the floating window-dependent display mode, and n is an integer greater than or equal to 2.

Further, the terminal displays, in the shared floating window, the application interface of the first application of the n foreground applications. The first application may be any one of the n foreground applications, or the first application is one of the n foreground applications that is recently used, or the first application is one of the n foreground applications that adopts the floating window-dependent display mode at a latest time, which is not limited in the embodiments.

Schematically, as illustrated in FIG. 14, the terminal displays a car hailing interface of the car hailing application in the shared floating window 1404.

At block 1304, an application switching operation is received.

At block 1305, in response to the application switching operation, the first application interface displayed in the shared floating window is switched to a second application interface of a second application, where the second application is one of the n foreground applications.

For implementation of blocks 1034 to 1035, reference may be made to blocks 302 to 303, and details thereof are not repeated here.

At block 1306, in response to a second floating window control operation, the displaying of the shared floating window is stopped, and the n application floating windows are displayed.

In a possible implementation, the terminal sets the second floating window control operation as a trigger operation to switching from "the shared floating window display mode" to →"the multi-application floating window display mode". The second floating window control operation may be a voice control operation, a gesture control operation, or a touch operation. The second floating window control operation may be different from the first floating window control operation, or may be the same as the first floating window control operation, which is not limited in the embodiments.

When the second floating window control operation is received, it is indicated that the user wishes the terminal to display the multiple applications on the same screen in a tiled manner. This triggers stopping of the displaying of the shared floating window, and restores the displaying of the n application floating windows.

Schematically, as illustrated in FIG. 14, when the user shakes the terminal again, the terminal determines that the second floating window control operation is received. Accordingly, the terminal stops displaying the shared floating window 1404, and restores the displaying of the application floating windows. The displaying of the application icons displayed in the switching area below the shared floating window 1404 is synchronously stopped.

In the embodiment, the user realizes the switching between the multi-application floating window display mode and the shared floating window display mode through the floating window control operations. This not only ensures the cleanliness whiling displaying the floating windows, but also meets the requirements of the user for displaying multiple applications on the same screen.

In the foregoing embodiments, the multiple foreground applications share a same shared floating window. In this case, in order to determine whether a floating window closing operation triggered by the user is directed to a single application or all applications, in a possible implementation, when there are at least two foreground applications adopting the floating window-dependent display mode, in response to a floating window closing operation for the shared floating window, the terminal displays a first close confirmation control and a second close confirmation control. The first close confirmation control is configured to indicate closing all foreground applications, and the second close confirmation control is configured to instruct closing the application currently displayed in the shared floating window.

Further, in response to a trigger operation performed on the first close confirmation control, the terminal closes the shared floating window, and stops the floating window-dependent display modes of the n foreground applications. In response to a trigger operation performed on the second close confirmation control, the terminal stops the floating window-dependent display mode of the second application.

Figure 15:
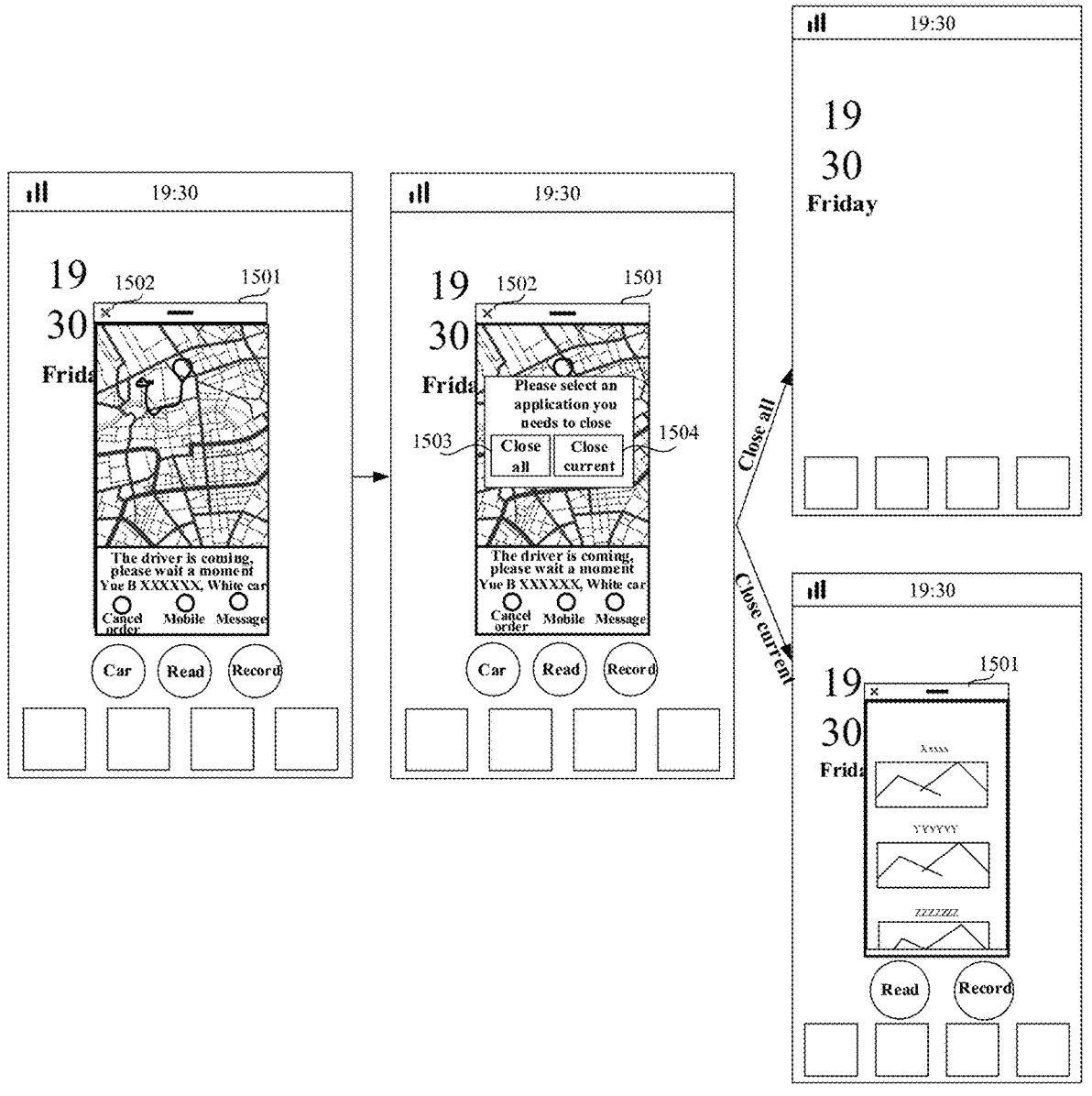
FIG. 15 is a schematic diagram illustrating interfaces in a process for closing an application according to an exemplary embodiment of the present disclosure.

Schematically, as illustrated in FIG. 15, when a click operation performed on a floating window closing control 1502 in the shared floating window 1501 is received, since there are three foreground applications (which are a car hailing application, a news application, and a sound recording application) adopting the floating window-dependent display mode, the terminal displays a first close confirmation control 1503 and a second close confirmation control 1504. When a click operation performed on the first close confirmation control 1503 is received, the terminal closes all the foreground applications and stops displaying the shared floating window 1501. When a click operation performed on the second close confirmation control 1504 is received, the terminal continues displaying the shared floating window 1501, and closes only the car hailing application currently displayed in the shared floating window 1501.

In the embodiment, in the case where the floating window-dependent display modes of multiple applications are enabled through the shared floating window, when receiving a floating window closing operation, the terminal displays a close confirmation control for the user to select whether to turn off the current application or turn off all the applications. This avoids falsely close all the applications, and is conductive to improving the accuracy of closing an application displayed in the floating window.

Figure 16:
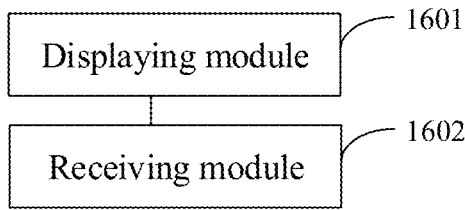
FIG. 16 is a structural block diagram of an application switching apparatus according to an embodiment of the present disclosure.

As illustrated in FIG. 16, a structural block diagram of an application switching apparatus according to an embodiment of the present disclosure is illustrated. The apparatus may be implemented as all or a part of the terminal by software, hardware, or a combination of the two. The apparatus includes:

a displaying module 1601, configured to display a first application interface of a first application in a shared floating window, where the first application is one of n foreground applications each adopting a floating window-dependent display mode, and n is an integer greater than or equal to 2; and a receiving module 1602, configured to receive an application switching operation;

the displaying module 1601 is further configured to, in response to the application switching operation, switch the first application interface displayed in the shared floating window to a second application interface of a second application, where the second application is one of the n foreground applications.

In some implementations, the receiving module 1602 includes:

a first receiving unit, configured to receive the application switching operation through a switching area corresponding to the shared floating window, where displaying of the switching area is associated with displaying of the shared floating window, and the switching area is located outside a display area of the shared floating window;

or, a second receiving unit, configured to receive the application switching operation through a floating window menu within the shared floating window.

In some implementations, the first receiving unit is configured to:

receive a selection operation performed on a target application identifier in the switching area, where the switching area includes application identifiers corresponding to the n foreground applications, and the target application identifier is an application identifier of the second application.

The displaying module 1601 is configured to:

in response to the selection operation performed on the target application identifier, switch the first application interface displayed in the shared floating window to the second application interface of the second application.

In some implementations, the displaying module 1601 is further configured to:

in response to a floating window display operation for a third application, switch the second application interface displayed in the shared floating window to a third application interface of the third application, where the third application is outside the n foreground applications;

in response to n being smaller than a threshold number, add an application identifier of the third application to the switching area; and in response to n being equal to or greater than the threshold number, add the application identifier of the third application in the switching area, and remove an application identifier of a fourth application in the n foreground applications, where the fourth application is an application of the n foreground applications that first adopts the floating window-dependent display mode.

In some implementations, the displaying module 1601 is further configured to:

in response to a first application-control operation performed on an application identifier corresponding to a fifth application in the switching area, remove the application identifier corresponding to the fifth application from the switching area, and stopping the floating window-dependent display mode of the fifth application; and in response to a second application-control operation performed on the application identifier corresponding to the fifth application in the switching area, make the application identifier corresponding to the fifth application fixedly displayed in the switching area, where the floating window-dependent display mode of the fifth application is maintained after the application identifier corresponding to the fifth application is fixedly displayed in the switching area.

In some implementations, the first receiving unit is further configured to:

receive a trigger operation performed on the switching area, where the switching area is configured to show a floating window stacking effect.

The displaying module 1601 is configured to:

in response to the trigger operation performed on the switching area, determine the second application based on an application switching order of the n foreground applications, and switch the first application interface displayed in the shared floating window to the second application interface of the second application.

In some implementations, the displaying module 1601 is further configured to:

in response to a floating window display operation performed on a third application, switch the second application interface displayed in the shared floating window to a third application interface of the third application, where the third application is outside the n foreground applications; and update the floating window stacking effect in the switching area, based on the number of the foreground applications adopting the floating window-dependent display mode.

In some implementations, the second receiving unit is configured to:

in response to a trigger operation performed on a menu callout control in the shared floating window, display a floating window menu in the shared floating window, where the floating window menu includes application identifiers corresponding to the n foreground applications; and receive a selection operation performed on a target application identifier in the floating window menu, where the target application identifier is an application identifier of the second application.

The displaying module 1601 is configured to:

in response to the selection operation performed on the target application identifier, switch the first application interface displayed in the shared floating window to the second application interface of the second application.

In some implementations, the apparatus further includes:

an adjusting module, configured to, when a first floating window display parameter corresponding to the first application is different from a second floating window display parameter corresponding to the second application, adjust a display state of the shared floating window based on the second floating window display parameter.

In some implementations, the displaying module 1601 is further configured to:

display n application floating windows, where the n application floating windows are used to display application interfaces of the n foreground applications; and in response to a first floating window control operation, stop displaying the n application floating windows, and display the shared floating window.

In some implementations, the displaying module 1601 is further configured to:

in response to a second floating window control operation, stop displaying the shared floating window, and display the n application floating windows.

In some implementations, the apparatus further includes a closing module, configured to:

in response to a floating window closing operation performed on the shared floating window when there are at least two foreground applications adopting the floating window-dependent display mode, display a first close confirmation control and a second close confirmation control;

in response to a trigger operation performed on the first close confirmation control, close the shared floating window and stop the floating window-dependent display modes of the n foreground applications; and in response to a trigger operation performed on the second close confirmation control, stop the floating window-dependent display mode of the second application.

In some implementations, the displaying module 1601 is further configured to:

in response to a full-screen display operation, display the second application interface in full screen; and display the shared floating window on an upper layer of the second application interface, and switch an application interface displayed in the shared floating window, where an application interface switched to is different from the second application interface.

In conclusion, in the embodiments of the present disclosure, when there are at least two foreground applications adopting the floating window-dependent display mode, a first application interface of a first application in the foreground applications is displayed in a shared floating window. When an application switching operation is received, a second application interface of a second application in the foreground applications is switched to and displayed in the shared floating window. In this way, switching among multiple applications each adopting the floating window-dependent display mode is enabled, and the efficiency of switching among different applications by the user is improved. Moreover, since the same shared floating window is used to display the interfaces of the foreground applications each adopting the floating window-dependent display mode, the mutual obscuration among multiple floating windows caused due to simultaneous display thereof can be avoided, and the obscuration caused by the floating windows on the background interface (the main interface or the application interface) can be reduced.

Figure 17:
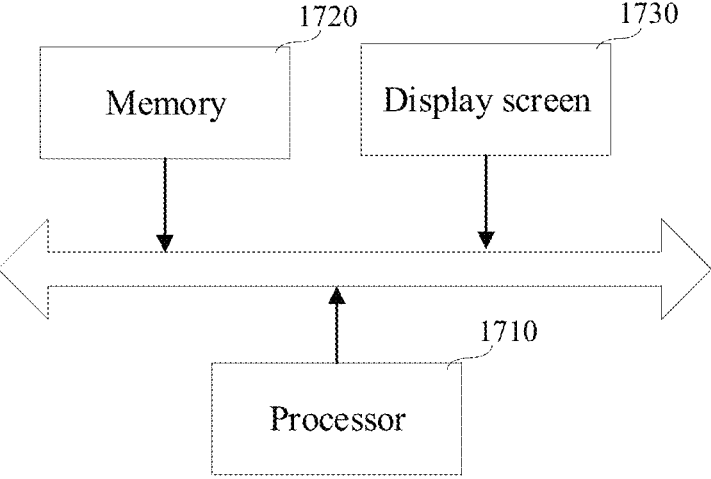
FIG. 17 is a structural block diagram of a terminal according to an exemplary embodiment of the present disclosure.

As illustrated in FIG. 17, a structural block diagram of a terminal according to an embodiment of the present disclosure is illustrated. The terminal in the present disclosure may include one or more of a processor 1710 and a memory 1720.

The processor 1710 may include one or more processing cores. The processor 1710 uses various interfaces and lines to connect various parts in the whole terminal, and performs various functions and processes data of the terminal by running or executing instructions, programs, code sets or instruction sets stored in the memory 1720, and invoking data stored in the memory 1720. Optionally, the processor 1710 may be implemented in at least one of a digital signal processing (DSP), a field-programmable gate array (FPGA), and a programmable logic array (PLA). The processor 1710 may be integrated with one or more of a central processing unit (CPU), a graphics processing unit (GPU), a neural network processor unit (NPU), and a modem. The CPU mainly processes an operating system, a user interface, an application, and the like. The GPU is responsible for rendering and drawing content that needs to be displayed by the touch display screen. The NPU is configured to implement an artificial intelligence (AI) function, and the modem is configured to process the wireless communication. It may be understood that the modem may not be integrated into the processor 1710, and is implemented separately by using a chip.

The memory 1720 may include a random access memory (RAM), or may include a read-only memory (ROM). Optionally, the memory 1720 includes a non-transitory computer-readable medium. The memory 1720 may be used to store instructions, programs, codes, code sets, or instruction sets. The memory 1720 may include a program storage area and a data storage area. The program storage area may store instructions for implementing an operating system, instructions for at least one function (for example, a touch function, a sound playing function, an image playing function, and the like), instructions for implementing the foregoing method embodiments, and the like. The data storage area may store data (such as audio data, a phone book) and the like created according to the use of the terminal.

The terminal in the embodiment of the present disclosure further includes a display screen 1730. The display screen 1730 is configured to perform image display, which may be a full screen display, a special-shaped screen, a curved display, a folding screen, or a double-sided screen, which is not limited in the embodiment of the present disclosure. In addition, the display screen 1730 may further support a touch function, and the user may perform a touch operation on an element in the interface by using a finger or a stylus.

In addition, those skilled in the art may understand that the structure of the terminal shown in the foregoing figures does not constitute a limitation on the terminal. The terminal may include more or fewer components than those illustrated in the figure, or combine some components, or arrange the components in a different way. For example, the terminal further includes components such as a radio frequency circuit, an input unit, a sensor, an audio circuit, a speaker, a microphone, and a power supply, and details of which are not described herein.

An embodiment of the present disclosure further provides a computer-readable storage medium storing at least one instruction. The at least one instruction is executed by the processor to implement the application switching method according to the foregoing embodiments.

An embodiment of the present disclosure provides a computer program product or a computer program, where the computer program product or the computer program includes computer instructions stored in a computer-readable storage medium. The processor of the terminal reads the computer instructions from the computer-readable storage medium, and the processor executes the computer instructions, to cause the terminal to implement the application switching method provided in the foregoing embodiments.

Those skilled in the art should appreciate that, in one or more of the foregoing embodiments, the functions described in the embodiments of the present disclosure may be implemented in hardware, software, firmware, or any combination thereof. When implemented in software, these functions may be stored in a computer-readable medium or transmitted as one or more instructions or codes on a computer-readable medium. The computer-readable medium includes a computer storage medium and a communication medium, where the communication medium includes any medium that facilitates transmission of a computer program from one place to another. The storage medium may be any available media that can be accessed by a general purpose or special purpose computer.

The foregoing illustrates only alternative embodiments of the present disclosure, and is not intended to limit the present disclosure. Any modification, equivalent substitution, improvement and the like, made within the spirit and principle of the present disclosure, shall fall within the protection scope of the present disclosure.

What is claimed is:

1. An application switching method, comprising:

displaying a first application interface of a first application in a shared floating window, wherein the first application is one of n foreground applications each adopting a floating window-dependent display mode in which mode a respective application adopts a floating window for display and function execution, and n is an integer greater than or equal to 2; the shared floating window is configured to be shared by the n foreground applications in such a manner that each of the n foreground applications displays its respective application interface through the shared floating window and only an application interface of one of the n foreground application is displayed in the shared floating window at a time, and an application whose application interface is displayed in the shared floating window is capable of executing its application functions in the shared floating window;

receiving an application switching operation; and in response to the application switching operation, switching, in the shared floating window, the first application interface to a second application interface of a second application, wherein the second application is one of the n foreground applications.

2. The method of claim 1, wherein receiving the application switching operation comprises:

receiving the application switching operation through a switching area corresponding to the shared floating window, wherein displaying of the switching area is associated with displaying of the shared floating window, and the switching area is located outside a display area of the shared floating window.

3. The method of claim 1, wherein receiving the application switching operation comprises:

receiving the application switching operation through a floating window menu in the shared floating window.

4. The method of claim 2, wherein receiving the application switching operation through the switching area corresponding to the shared floating window comprises:

receiving a selection operation performed on a target application identifier in the switching area, wherein the switching area comprises application identifiers corresponding to the n foreground applications, and the target application identifier is an application identifier of the second application; and switching, in the shared floating window, the first application interface to the second application interface of the second application in response to the application switching operation, comprises:

in response to the selection operation performed on the target application identifier, switching, in the shared floating window, the first application interface to the second application interface of the second application.

5. The method of claim 4, wherein the method further comprises:

in response to a floating window display operation for a third application, switching, in the shared floating window, the second application interface to a third application interface of the third application, wherein the third application is outside the n foreground applications;

in response to n being smaller than a threshold number, adding an application identifier of the third application into the switching area; and in response to n being equal to or greater than the threshold number, adding the application identifier of the third application into the switching area, and removing an application identifier of a fourth application in the n foreground applications.

6. The method of claim 5, wherein the method further comprises:

determining, as the fourth application, an application of the n foreground applications that first adopts the floating window-dependent display mode; or determining, as the fourth application, an application of the n foreground applications that has a lowest usage frequency; or determining, as the fourth application, an application of the n foreground applications that has a lowest relevance to the third application.

7. The method of claim 4, wherein the method further comprises:

in response to a first application-control operation performed on an application identifier corresponding to a fifth application in the switching area, removing the application identifier corresponding to the fifth application from the switching area, and stopping the floating window-dependent display mode of the fifth application; and in response to a second application-control operation performed on the application identifier corresponding to the fifth application in the switching area, making the application identifier corresponding to the fifth application fixedly displayed in the switching area, wherein the floating window-dependent display mode of the fifth application is maintained after the application identifier corresponding to the fifth application is fixedly displayed in the switching area.

8. The method of claim 2, wherein receiving the application switching operation through the switching area corresponding to the shared floating window comprises:

receiving a trigger operation performed on the switching area, wherein the switching area is configured to show a floating window stacking effect; and switching, in the shared floating window, the first application interface to the second application interface of the second application in response to the application switching operation, comprises:

in response to the trigger operation performed on the switching area, determining the second application based on an application switching order of the n foreground applications, and switching, in the shared floating window, the first application interface to the second application interface of the second application.

9. The method of claim 8, wherein the method further comprises:

in response to a floating window display operation performed on a third application, switching, in the shared floating window, the second application interface to a third application interface of the third application, wherein the third application is outside the n foreground applications; and updating the floating window stacking effect in the switching area, based on the number of the foreground applications adopting the floating window-dependent display mode.

10. The method of claim 3, wherein receiving the application switching operation through the floating window menu in the shared floating window comprises:

in response to a trigger operation performed on a menu callout control in the shared floating window, displaying the floating window menu in the shared floating window, wherein the floating window menu comprises application identifiers corresponding to the n foreground applications; and receiving a selection operation performed on a target application identifier in the floating window menu, wherein the target application identifier is an application identifier of the second application; and switching, in the shared floating window, the first application interface to the second application interface of the second application in response to the application switching operation, comprises:

in response to the selection operation performed on the target application identifier, switching, in the shared floating window, the first application interface to the second application interface of the second application.

11. The method of claim 1, wherein before switching, in the shared floating window, the first application interface to the second application interface of the second application in response to the application switching operation, the method further comprises:

in response to a first floating window display parameter corresponding to the first application being different from a second floating window display parameter corresponding to the second application, adjusting a display state of the shared floating window based on the second floating window display parameter.

12. The method of claim 1, wherein before displaying the first application interface of the first application in the shared floating window, the method comprises:

displaying n application floating windows, wherein the n application floating windows are configured to display application interfaces of the n foreground applications respectively; and in response to a first floating window control operation, stopping displaying the n application floating windows, and displaying the shared floating window.

13. The method of claim 12, wherein the method further comprises:

in response to a second floating window control operation, stopping displaying of the shared floating window, and displaying the n application floating windows.

14. The method of claim 1, wherein the method further comprises:

in response to a floating window closing operation performed on the shared floating window when there are at least two foreground applications adopting the floating window-dependent display mode, displaying a first close confirmation control and a second close confirmation control;

in response to a trigger operation performed on the first close confirmation control, closing the shared floating window and stopping the floating window-dependent display modes of the n foreground applications; and in response to a trigger operation performed on the second close confirmation control, stopping the floating window-dependent display mode of the second application.

15. The method of claim 1, wherein the method further comprises:

in response to a full-screen display operation, displaying the second application interface in full screen; and displaying the shared floating window on an upper layer of the second application interface, and switching the application interface displayed in the shared floating window, wherein an application interface switched to is different from the second application interface.

16. The method of claim 2, wherein the displaying of the switching area being associated with the displaying of the shared floating window comprises:

changing a display position of the switching area in response to a change of a display position of the shared floating window, to keep a relative position of the switching area relative to the shared floating window unchanged.

17. The method of claim 4, further comprising:

displaying, in the switching area, the application identifiers corresponding to the n foreground applications in a sequential order that the n foreground applications adopt the floating window-dependent display mode.

18. The method of claim 4, wherein the method further comprises:

highlighting, in the switching area, an application identifier corresponding to an application whose application interface is currently displayed in the shared floating window.

19. A terminal, comprising a processor and a memory, wherein the memory stores at least one instruction, and the at least one instruction is configured to be executed by the processor to:

display a first application interface of a first application in a shared floating window, wherein the first application is one of n foreground applications each adopting a floating window-dependent display mode in which mode a respective application adopts a floating window for display and function execution, and n is an integer greater than or equal to 2; the shared floating window is configured to be shared by the n foreground applications in such a manner that each of the n foreground applications displays its respective application interface through the shared floating window and only an application interface of one of the n foreground application is displayed in the shared floating window at a time, and an application whose application interface is displayed in the shared floating window is capable of executing its application functions in the shared floating window; and in response to an application switching operation, switch, in the shared floating window, the first application interface to a second application interface of a second application, wherein the second application is one of the n foreground applications.

20. A non-transitory computer-readable storage medium, wherein the storage medium stores at least one instruction, which when executed by a processor, causes the processor to:

display a first application interface of a first application in a shared floating window, wherein the first application is one of n foreground applications each adopting a floating window-dependent display mode in which mode a respective application adopts a floating window for display and function execution, and n is an integer greater than or equal to 2; the shared floating window is configured to be shared by the n foreground applications in such a manner that each of the n foreground applications displays its respective application interface through the shared floating window and only an application interface of one of the n foreground application is displayed in the shared floating window at a time, and an application whose application interface is displayed in the shared floating window is capable of executing its application functions in the shared floating window; and in response to an application switching operation received through a switching area or a floating window menu associated with the shared floating window, switch, in the shared floating window, the first application interface to a second application interface of a second application, wherein the second application is one of the n foreground applications.

* * * * *